US012661874B2

(12) United States Patent
Girard

(10) Patent No.: US 12,661,874 B2
(45) Date of Patent: Jun. 23, 2026

(54) VEHICLE GLAZING AND ASSOCIATED DEVICE WITH NEAR-INFRARED VISION SYSTEM

(71) Applicant: SAINT-GOBAIN GLASS FRANCE, Courbevoie (FR)

(72) Inventor: Pauline Girard, Compiegne (FR)

(73) Assignee: SAINT GOBAIN SEKURIT FRANCE, Thourotte (FR)

( * ) Notice: Subject to any disclaimer, the term of this patent is extended or adjusted under 35 U.S.C. 154(b) by 321 days.

(21) Appl. No.: 18/551,111

(22) PCT Filed: Mar. 23, 2022

(86) PCT No.: PCT/FR2022/050539
§ 371 (c)(1),
(2) Date: Sep. 18, 2023

(87) PCT Pub. No.: WO2022/200735
PCT Pub. Date: Sep. 29, 2022

(65) Prior Publication Data
US 2024/0181751 A1 Jun. 6, 2024

(30) Foreign Application Priority Data

Mar. 24, 2021 (FR) ...................................... 2102963

(51) Int. Cl.
B32B 17/10 (2006.01)
B32B 3/26 (2006.01)
(Continued)

(52) U.S. Cl.
CPC ........ B32B 17/10449 (2013.01); B32B 3/266 (2013.01); B32B 17/10036 (2013.01);
(Continued)

(58) Field of Classification Search
CPC .............. B32B 3/266; B32B 17/10036; B32B 17/1011; B32B 17/10119; B32B 17/10137; B32B 17/10174; B32B 17/10229; B32B 17/10293; B32B 17/10348; B32B 17/10385; B32B 17/10449;
(Continued)

(56) References Cited

U.S. PATENT DOCUMENTS 5,162,046 A 11/1992 Mercado
6,132,882 A 10/2000 Landin et al.
(Continued)

FOREIGN PATENT DOCUMENTS

CN 102838889 A 12/2012
CN 110228236 A 9/2019
(Continued)

OTHER PUBLICATIONS

English translation of FR3090822A1 (Year: 2020).*
(Continued)

*Primary Examiner* — Mark R Gaworecki
(74) *Attorney, Agent, or Firm* — CUSHMAN PARTNERS, LLC

(57) ABSTRACT
A vehicle glazing includes a first extra clear glass sheet forming an exterior glazing) and an anti-reflective coating that is anti-reflective at 905 nm or 1550 nm.

20 Claims, 9 Drawing Sheets

(51) Int. Cl.

| | |
|---|---|
| *C03C 17/34* | (2006.01) |
| *G01S 7/481* | (2006.01) |
| *G01S 17/931* | (2020.01) |
| *G02B 1/11* | (2015.01) |

(52) U.S. Cl.
CPC .. *B32B 17/10137* (2013.01); *B32B 17/10229* (2013.01); *B32B 17/10348* (2013.01); *B32B 17/10385* (2013.01); *B32B 17/10761* (2013.01); *C03C 17/3417* (2013.01); *G01S 7/4813* (2013.01); *G01S 17/931* (2020.01); *G02B 1/11* (2013.01); *B32B 2307/7376* (2023.05); *B32B 2605/00* (2013.01); *C03C 2217/732* (2013.01)

(58) Field of Classification Search
CPC .......... B32B 17/1055; B32B 17/10761; B32B 2307/7376; B32B 2605/00; C03C 3/087; C03C 17/007; C03C 17/3411; C03C 17/3417; C03C 17/3655; C03C 2217/73; C03C 2217/732; C03C 2218/365; G01S 7/4813; G01S 17/931; G02B 1/11; G02B 5/208
See application file for complete search history.

(56) References Cited

U.S. PATENT DOCUMENTS

| | | | |
|---|---|---|---|
| 2004/0258929 A1 | 12/2004 | Glaubitt et al. | |
| 2012/0014881 A1 | 1/2012 | Lewinsohn et al. | |
| 2021/0059022 A1 | 2/2021 | Sadakane et al. | |

FOREIGN PATENT DOCUMENTS

| | | | | | |
|---|---|---|---|---|---|
| CN | 111409314 | A | 7/2020 | | |
| EP | 1329433 | A1 | 7/2003 | | |
| EP | 3 769 960 | A1 | 1/2021 | | |
| FR | 3090822 | A1 * | 6/2020 | .......... | G01S 7/4813 |
| JP | S54-159453 | A | 12/1979 | | |
| JP | 2010-509175 | A | 3/2010 | | |
| JP | 2012-517396 | A | 8/2012 | | |
| JP | 2021-018253 | A | 2/2021 | | |
| WO | WO 93/07329 | A1 | 4/1993 | | |
| WO | WO 02/006170 | A1 | 1/2002 | | |
| WO | WO 2004/025334 | A2 | 3/2004 | | |
| WO | WO 2005/049757 | A1 | 6/2005 | | |
| WO | WO 2008/059170 | A2 | 5/2008 | | |
| WO | WO 2018/015312 | A1 | 1/2018 | | |
| WO | WO2020/017495 | A1 | 1/2020 | | |

OTHER PUBLICATIONS

Third Office Action as issued in Chinese Patent Application No. 202280002957.2, dated Nov. 21, 2023.
Song, X., et al., "Technology of Inorganic Material," Metallurgical Industry Press, 1st Edition, Sep. 2007, published on Sep. 30, 2007, pp. 492 (English translation of relevant portion attached).
International Search Report as issued in International Patent Application No. PCT/FR2022/050539, dated Jun. 15, 2022.
Office Action as issued in Japanese Patent Application No. 2023-558502, dated Feb. 3, 2026.

* cited by examiner

VEHICLE GLAZING AND ASSOCIATED DEVICE WITH NEAR-INFRARED VISION SYSTEM

CROSS-REFERENCE TO RELATED APPLICATIONS

This application is the U.S. National Stage of PCT/FR2022/050539, filed Mar. 23, 2022, which in turn claims priority to French patent application number 2102963 filed Mar. 24, 2021. The content of these applications are incorporated herein by reference in their entireties.

The invention relates to a glazing, in particular a windshield, in a vehicle particularly a road vehicle or train, associated with a near infrared vision system. The invention likewise describes a device combining said glazing and the vision system.

Autonomous vehicle glazings and the associated technology are constantly evolving, particularly for improving safety. Laser remote sensing or LIDAR, an acronym for "light detection and ranging" or "laser detection and ranging" can be used in the headlights of autonomous vehicles.

More recently, patent application WO20180153012 suggests placing a LIDAR operating in the near infrared between 750 nm and 1050 nm behind the laminated windscreen comprising two sheets of extra clear glass and an infrared filter.

The performance of this vision device (glazing associated with the LIDAR) can be improved.

More broadly, the invention is also aimed at a device with an infrared vision system. More precisely, the present invention relates to a vehicle glazing particularly of a road vehicle (car, truck, public transport: bus, coach, etc.) or railway vehicle (particularly with a maximum speed of at most 90 km/h or at most 70 km/h, in particular metros, trams), particularly curved, particularly a windshield (laminated), or even a rear window (monolithic optionally tempered or laminated), or even a side glazing (monolithic optionally tempered or laminated) of a given thickness E1 for example sub-centimetric, particularly of at most 9 mm or 7 mm or 5 mm for a road vehicle windshield, glazing particularly laminated comprising:

a first glass sheet, particularly curved, intended to be the exterior glazing, with a first external main face F1 and a second internal main face F2 oriented toward the passenger compartment, if it's a motor vehicle with a thickness preferably of no more than 4 mm, and even of no more than 3 mm or 2.5 mm, particularly 2.1 mm, 1.9 mm, 1.8 mm, 1.6 mm and 1.4 mm—and preferably of at least 0.7 mm or 1 mm, the second glass sheet particularly silica-based, soda-lime-based, preferably soda-lime-silica-based, or alumino-silicate-based, or borosilicate-based, first glass sheet which preferably has a total iron oxide content by weight (expressed in the form $Fe_2O_3$) of at most 0.05% preferably a lamination interlayer (single or multi-sheets), optionally neutral, clear, extra clear or tinted particularly grey or green, made of polymer material preferably thermoplastic and better still polyvinyl butyral (PVB preferably including plasticizers), preferably if a road vehicle with a thickness of at most 1.8 mm, better of at most 1.2 mm and even better of at most 0.9 mm (and better of at least 0.3 mm and even of at least 0.6 mm), the lamination interlayer being optionally acoustic and/or optionally having a cross section decreasing in the shape of a wedge from top to bottom of the laminated glazing (in particular a windshield) for a head-up display (HUD), the lamination interlayer having a main face Fa oriented toward F2 and a main face Fb opposite Fa preferably a second glass sheet intended to be the interior glazing, preferably curved and in particular tinted, with a third main face F3 on the side of F2 and a fourth main internal face F4 oriented toward the passenger compartment, if a road vehicle with a thickness preferably less than that of the first glazing, even of at most 3 mm or 2 mm—particularly 1.9 mm, 1.8 mm, 1.6 mm and 1.4 mm—or even of at most 1.3 mm, and preferably of at least 0.7 mm, the thickness of the first and second glass sheets being preferably strictly less than 5 or 4 mm, even than 3.7 mm, the second glass sheet particularly silica-based, soda-lime-based, preferably soda-lime-silica-based, or aluminosilicate-based, or borosilicate-based.

At least one first zone, called infrared transmission zone particularly of smaller dimension by at least 3 cm and of greater dimension by at least 70 cm of said glazing, is transparent at least a first wavelength LB1 so-called working in the infrared region which is 905 nm±30 nm even ±10 nm and/or at least a second wavelength LB2 so-called working in the infrared region which is 1550 nm±30 nm even ±10 nm.

In said infrared transmission zone, the glazing comprises opposite face F1 (therefore on face F2 side):

a) an anti-reflective coating (monolayer) at the first working wavelength LB1 with a thickness which is 165 nm±50 nm and even ±30 nm and in particular ±15 nm in the infrared transmission zone, the glazing with said anti-reflective coating has a total transmission of at least 85% or at least 90.0%, 91.0%, or 92.0% or 93% or 94% at the first working wavelength LB1, particularly measured at the angle of incidence of 0° (in other words at 90° relative to the local plane of the bearing substrate of said anti-reflective coating) even also preferably with a total transmission of at least 80% or 85% or 86% measured at an angle of incidence of 60°.

b) or an anti-reflective coating (monolayer) at the second working wavelength LB2 with a thickness which is 275 nm±50 nm and even ±30 nm and in particular ±15 nm in the infrared transmission zone, the glazing with said anti-reflective coating has a total transmission of at least 85% or at least 90.0%, 91.0%, or 92.0% or 93% or 94% at the second working wavelength LB2, particularly measured at the angle of incidence of 0° even also preferably with a total transmission of at least 80% or 85% measured at an angle of incidence of 60°.

Advantageously:

for a) said anti-reflective coating has a reflection of at most 7% or 5% at the first working wavelength LB1 at the angle of incidence of 8° and even of at most 14% or 13% or 12% at the angle of incidence of 60°;

or for b) said anti-reflective coating has a reflection of at most 7% or 5% at the second working wavelength LB2 at the angle of incidence of 8° and even of at most 14% or 13% or 12% at the angle of incidence of 60°.

These specific thicknesses significantly improve the performance of LIDARs operating at LB1 and/or LB2.

For example the bearing substrate of the anti-reflective coating is of refraction index n0 of 1.4 to 1.6 at 550 nm, and the anti-reflective coating is of refraction index n1 of at most 1.3 at ±0.2 at 550 nm.

The invention is particularly suitable for glazings (windscreen, window, etc.) for autonomous or semi-autonomous vehicles: levels L2+, L3, L4 and L5 ("fully" autonomous) as well as vehicles such as Robot Taxis and shuttles, etc.

The angle of the glazing particularly a windshield of a road vehicle can typically be between 21° and 36° relative to the ground and on average 30°. Also, a high transmission at 60° is particularly advantageous for it is the angle of incidence of the beam of the LIDAR on the windshield if the latter is at 30° from the ground.

The infrared transmission is measured for example with a Fourier spectrometer such as BrukerVertex-70.

The anti-reflective coating (monolayer) may comprise a layer of porous silica (with a free surface), particularly nanoporous, preferably sol-gel particularly with a porosity degree of 20% to 70% particularly from 35% to 65% and even from 40% to 50%.

The anti-reflective coating, particularly local, may preferably protrude by at most 100 mm, 50 mm, 30 mm or 20 mm or 10 mm from the infrared transmission area and particularly occupy less than 30%, 10%, 5% of the glazing.

In a first embodiment, the pores are the gaps of a non-compact stack of nanometric beads, particularly of silica, this layer being disclosed for example in document US20040258929.

In a second embodiment, the porous silica layer is obtained by depositing a condensed silica sol (silica oligomers) densified by vapors of NH3 type, this layer being described for example in document WO2005049757.

In a third embodiment, the porous silica layer may also be of the sol-gel type as is described in document EP1329433. The porous layer may also be obtained with other known pore-forming agents: micelles of cationic surfactant molecules in solution and, optionally, in hydrolyzed form, or of anionic, non-ionic surfactants, or amphiphilic molecules, for example block copolymers.

In a fourth embodiment, the porous silica layer may also be of the sol-gel type as is described in document WO2008/059170. The porous layer may thus be obtained with pore-forming agents which are preferably polymeric beads.

The layer of porous silica may have closed pores (of a size less than the thickness of the layer) of at least 20 nm, 50 nm or 80 nm and preferably of at most 120 nm or 100 nm) optionally the functional layer may comprise pores with a concentration increasing in the direction of the free surface. The pores can have an elongated shape, particularly like a grain of rice. Even more preferentially, the pores can be substantially spherical or oval-shaped. It is preferred for the majority of the closed pores, even at least 80% of them, to have a substantially identical given shape, particularly elongated, substantially spherical or oval. The porous silica may be doped for example to further improve its hydrolytic content in the case of applications which require great strength (facades, exteriors, etc.). The doping elements can preferably be selected from Al, Zr, B, Sn, Zn. The dopant is introduced to replace the Si atoms in a molar percentage that can preferably reach 10%, even more preferentially up to 5%.

The porous silica layer particularly sol gel may be obtained without high temperature heat treatment (particularly of more than 300° C. or 400° C.). The anti-reflective coating may comprise a chemical protection underlayer preferably of refraction index at a reference wavelength (550 nm or at LB1 or LB2) intermediate between the refraction index n0 at the reference wavelength of the substrate and the one n1 at the reference wavelength of the anti-reflective layer for example of at most 1.45 to 550 nm, particularly at most 200 nm or 120 nm thick, for example, particularly a dense silica layer (of refraction index at 1.4), by sol gel with the porous silica functional layer (anti-reflective) (sol-gel) positioned on top.

The anti-reflective coating thus comprises only one porous silica layer (monolayer) and optionally this underlayer which can also strengthen its anti-reflective function. The underlayer can be based on silica or at least partially oxidized derivatives of silicon selected from silicon dioxide, sub-stoichiometric silicon oxides, oxycarbide, oxynitride or oxycarbonitride of silicon. The underlayer is useful when the underlying surface is made of soda-lime-silica glass because it acts as a barrier to the alkalis. This underlayer therefore advantageously comprises Si, O, optionally carbon and nitrogen. But it can also include minority materials with respect to the silicon, for example metals like Al, Zn or Zr. The underlayer can be deposited by sol-gel or by pyrolysis, particularly by gas-phase pyrolysis (CVD). The latter technique makes it possible to obtain layers of $SiO_xC_y$ or $SiO_2$ quite easily, particularly by deposit directly on the float glass ribbon in the case of glass substrates. But the deposition can also be carried out by a vacuum technique, for example by cathode sputtering from a Si target (optionally doped) or from a silicon suboxide target (in a reactive oxidizing and/or nitriding atmosphere for example). This underlayer preferably has a thickness of at least 5 nm, particularly a thickness of between 10 nm and 200 nm, for example between 80 nm and 120 nm.

The porous silica layer has a free surface. The anti-reflective coating can also comprise an overlayer if it does not alter the anti-reflective properties.

An anti-reflective coating may also be placed on Face F1 opposite that on face F2 side (face F2 or F4 or on a face of a piece as described hereinafter).

The anti-reflective coating can have the same shape as the section of the infrared transmission zone for example trapezoidal or even rectangular, etc.

The anti-reflective coating may be on a substrate (particularly made of glass and preferably extra clear).

when the glazing is laminated, in particular a windshield, and comprises the lamination interlayer and the second glass sheet, the substrate is selected from among:

i) the second glass sheet, particularly made of extra clear glass, anti-reflective coating on face F4 bare or (already) coated with a functional coating (camouflaging, athermic, heating etc) in particular more than 200 nm thick, (so-called first glazing configuration)

or j) on a piece, anti-reflective coating on the free face of the transparent piece at said first working wavelength LB1 and/or at said second working wavelength LB2 which is under and/or in a through-hole (in particular preferably in and even partly under the through-hole, particularly (over)flush with face F4) of the second glass sheet (in the infrared transmission zone) (so-called second glazing configuration), in particular piece on the lamination interlayer with a potential interlayer blind hole (part protruding or not under the through-hole) or piece adhered to face F2 (bare or coated with a functional coating) with the lamination interlayer perforated by an interlayer through-hole in line with the through-hole or k) the first glass sheet, particularly made of extra clear glass, on face F2 bare or (already) coated with a functional coating (preferably camouflaging coating, or even athermic coating, heating coating etc) particularly no more than 200 nm thick, the lamination interlayer being perforated by an interlayer through-hole in line with a through-hole of the second glass sheet (in the infrared transmission zone), (so-called third glazing configuration).

when the glazing is monolithic, in particular side or rear window, the substrate is:

l) the first glass sheet, particularly made of extra clear glass, anti-reflective coating on face F2 (12), bare or coated with a functional coating, In the second configuration, this piece according to the invention is added preferably in (and even under) the through-hole of the second glass sheet in order to improve security.

The size of the piece in the through-hole (width and/or surface) is lower than the through-hole of the second glass sheet, a piece with an edge face in contact with or spaced from the wall of the second glass sheet delimiting the through-hole of the second glass sheet by no more than 5 mm, preferably spaced and by a distance of no more than 2 mm and even ranging from 0.1 mm or 0.3 mm to 2 mm or even to 0.7 mm. The surface of the piece may be under flush to face F4, flush to face F4, over flush to face F4.

The piece can be curved (convex), following the curvature of the first (or second) glass sheet; particularly, the piece is curved and particularly is a tempered or annealed glass which follows the curvature of the first (or second) glass sheet. With respect to the glass bending process reference may be made to patent WO2002006170.

The piece may be polymeric or made of glass preferably extra clear particularly annealed or tempered (thermically) or chemically tempered or even without high temperature heat treatment (of at least 300° C. or 400° C.). The annealing particularly of at least 300° C. or 400° C. may result from the manufacturing method of the bearing silica layer (elimination of porogenous agent and/or densification of the layer particularly). The temperature for curving the piece may be used to form the silica layer (elimination of pore-forming agent and/or densification of the layer particularly).

The piece may be made of silica-based, soda-lime-based, soda-lime-silica-based, or aluminosilicate-based, or borosilicate-based glass, and in particular extra clear glass. The piece may have a total iron oxide content by weight (expressed in the form $Fe_2O_3$) of at most 0.05% (500 ppm), preferably of at most 0.03% (300 ppm) and of at most 0.015% (150 ppm) and particularly greater than or equal to 0.005%.

The thickness of the piece, particularly made of glass preferably extra clear or polymeric, may be at least 0.1 mm or even at least 0.3 mm, and at most 2.2 mm or 1.5 mm or even at most 1.1 mm or 1 mm or 0.9 mm or 0.75 mm (depending on the requested transmission level and/or requested security reinforcement).

The piece, in particular made of glass, may be cold curved (domed) (due to its flexibility) for example for a piece at most 0.9 mm or 0.75 mm or even the glass piece is curved by the curving similar to that of a glass sheet for example for a piece at least 0.75 mm or 0.9 mm thick.

The thickness of the piece, in particular made of glass, may be lower than the thickness of the second glass sheet.

As an example of thin glass Corning's Gorilla® glasses, aluminosilicate glass and optionally chemical tempered glasses may be mentioned.

In the case of a laminated glazing the infrared transmission zone may thus comprise:

the first glass sheet with the anti-reflective coating on face F2 (second perforated sheet, without piece within) preferably directly on face F2 (tin or opposite face etc)

the first glass sheet, the lamination interlayer, the second glass sheet with the anti-reflective coating on face F4 the first glass sheet, the lamination interlayer or an adhesive to bind the piece with the anti-reflective coating in the through-hole of the second glass sheet The highest transparency possible at LB1 and/or LB2 is selected for each of the elements (and any other added as a functional coating particularly for camouflaging) in the infrared transmission zone.

The infrared transmission zone may be in a peripheral region of the glazing preferably on the upper longitudinal edge and even in a central peripheral region the antireflective coating is local or protrudes from the infrared transmission zone covering all or piece of the glazing (in particular if it is in F4).

The anti-reflective coating (then local) according to the invention may for example protrude beyond the infrared transmission zone of at most 100 mm or 50 mm or 10 mm.

The infrared transmission zone may be opening on the edge face of the glazing, and the anti-reflective coating may be opening on or spaced apart from the edge face of the glazing particularly by at least 3 cm or 5 cm or 1 cm.

The infrared transmission zone may be spaced apart from the edge face of the glazing particularly by at least 3 cm or 5 cm, and the anti-reflective coating may be opening on or spaced apart from the edge face of the glazing particularly by at least 3 cm or 5 cm or 1 cm.

The infrared transmission zone may be (defined by a surface) centimetric particularly smaller by at least 5 cm and preferably larger by no more than 70 cm or 50 cm.

For example the infrared transmission zone may be local on the glazing, particularly with a height (taken edge to edge on a surface of the glazing for example the first glass sheet) of no more than 30 cm (and at least centimetric, of at least 5 cm) and with a length of no more than 70 cm or 50 cm (and at least centimetric, of at least 5 cm or 10 cm).

The infrared transmission zone (particularly defined by the surface of the first glass sheet in this zone) may particularly be of convex cross-section especially preferably trapezoidal, or even circular or oval or ellipsoid or even rectangular, square.

The infrared transmission zone (particularly defined by the surface of the first glass sheet in this zone) may be:

closed (surrounded by the wall of the second glass sheet), therefore within the glazing particularly spaced apart from the closest edge face of the glazing by at least 3 cm or 5 cm opening on the edge face of the glazing.

There may be another infrared transmission zone (of centimetric size, disjoined from said infrared transmission zone (particularly with a similar size and/or shape to said infrared transmission zone), particularly one dedicated for the transmitter and the other for the receiver of the infrared vision system (Lidar). The anti-reflective coating may be a coating common to these two infrared transmission zones (in particular if it is the anti-reflective coating in face F2 or F4) or there even is an anti-reflective coating according to the invention for each of the infrared transmission zones (in particular on two parts in two disjoined through-holes of the second glass sheet).

The first glass sheet particularly silica-based, soda-lime-based, (preferably) soda-lime-silica-based, or aluminosilicate-based, or borosilicate-based. The first glass sheet may have a total iron oxide content by weight (expressed in the form $Fe_2O_3$) of at most 0.05% (500 ppm), preferably of at most 0.03% (300 ppm) and of at most 0.015% (150 ppm) and particularly greater than or equal to 0.005%.

In the case of laminated glazing, the second glass sheet particularly silica-based, soda-lime-based, preferably soda-lime-silica-based (and like the first glass sheet), even aluminosilicate-based, or borosilicate-based may have:

i) in first glazing configuration, a total iron oxide content by weight (expressed in the form $Fe_2O_3$) of at most 0.05% (500 ppm), preferably of at most 0.03% (300 ppm) and of at most 0.015% (150 ppm) and particularly greater than or equal to 0.005%, in particular an extra clear glass.

j) or in second or third glazing configuration, a total iron oxide content by weight (expressed in the form $Fe_2O_3$) of at most 0.4% and preferably of at most 1.5%.

In the second or third configuration according to the invention, to reach a high level of transmission, the following are selected:

1) an exterior glass that is extra clear in the targeted near-infrared region, 2) an interior glass that is more absorbent in the near-infrared region and necessarily hollowed out by the through-hole of the second glass sheet.

Additionally, by avoiding the use of a second extra clear glass sheet, it improves the comfort (heat inside the vehicle), aesthetics and is less expensive.

Iron oxide, present as an impurity in most of the natural raw materials used in glassmaking (sand, feldspar, limestone, dolomite, etc.), absorbs both in the visible and near-ultraviolet region (absorption due to the ferric ion $Fe^{3+}$) and especially in the visible and near-infrared region (absorption due to the ferrous ion $Fe^{2+}$). This is why the iron oxide is reduced in the first glass sheet.

In the second glass sheet, the choice can be made to have a higher level of iron oxide.

In order to quantify the transmission of the glass in the visible region, a light transmission factor, referred to as light transmission, is often defined, often abbreviated to "$T_L$", calculated between 380 and 780 nm and applied to a glass thickness of 3.2 mm or 4 mm, according to ISO standard 9050:2003, thus taking into account the illuminant D65 as defined by standard ISO/CIE 10526 and the C.I.E. 1931 colorimetric reference observer as defined by standard ISO/CIE 10527.

Naturally, the light transmission $T_L$ of the glazing (laminated etc.) in a zone outside infrared transmission (central zone of the windshield) is preferably of at least 70% or 75%, 80% or 85%, 88%.

In the second or third glazing configuration, the second glass sheet particularly is green, blue, grey. The second glass sheet can be green by the $Fe_2O_3$ or blue with CoO and Se or grey with Se and CoO.

The glasses of the applicant called TSAnx (0.5 to 0.6% iron) TSA2+, TSA3+ (0.8 to 0.9% iron), TSA4+ (1% iron), TSA5+, for example green, can be particularly mentioned.

TSA3+ (2.1 mm) for example has a total transmission at 905 mm of about 40% and at 1550 mm of about 50%.

The second glass sheet may have a redox, defined as being the ratio between the content by weight of FeO (ferrous iron) and the total iron oxide content by weight (expressed in the form $Fe_2O_3$) between 0.22 and 0.35 or 0.30.

Said second glass sheet can have a chemical composition that comprises the following constituents in a content varying within the limits by weight defined hereinafter:

| | |
|---|---|
| $SiO_2$ | 64-75% |
| $Al_2O_3$ | 0-5% |

-continued

| | |
|---|---|
| $B_2O_3$ | 0-5%, |
| CaO | 2-15% |
| MgO | 0-5% |
| $Na_2O$ | 9-18% |
| $K_2O$ | 0-5% |
| $SO_3$ | 0.1-0.35% |
| $Fe_2O_3$ (total iron) | at least 0.4% and even 0.4 to 1.5%, |
| Optionally redox | 0.22-0.3 |

And particularly less than 0.1% impurities.

The through-hole of the second glass sheet may be:

closed hole (surrounded by the wall of the second glass sheet), therefore within the glazing particularly spaced apart from the closest edge face of the glazing by at least 3 cm or 5 cm open or opening, forming a notch (peripheral).

The through-hole of the second glass sheet is preferably in a peripheral zone of the laminated glazing preferably on the upper longitudinal edge and/or in a peripheral central region and the anti-reflective coating is local and in this peripheral region.

The through-hole of the second glass sheet has a given shape particularly of convex right cross-section, for example trapezoidal or rectangular or round or oval. The anti-reflective coating can have a homothetic shape or any other shape, for example rectangular.

If necessary, several through-holes (2, 3 holes) in the second glass sheet of identical shape and/or dimensions can be envisaged, for example in particular side by side in this peripheral area. Face F2 then comprises a common anti-reflective coating a) or b) with a free surface in all the holes or a local anti-reflective coating a) or b) different for each hole.

The shape and dimensions of the through-hole of the second glass sheet are configured according to the techniques of the art in order to effectively and selectively collect all the radiation passing through the glazing (windshield, window, etc.), particularly in the case of the LIDAR the radiation reflected from a solid angle range outside the vehicle and coming from the area in front of the vehicle that is to be captured via the LIDAR.

For example the through-hole of the second glass sheet has the same shape as the infrared vision system such as the LIDAR.

The trough-hole (open or closed) of the second glass sheet may be in particular of convex cross-section especially preferably trapezoidal, or circular or oval or ellipsoid or even rectangular, square . . .

If the through-hole of the second glass sheet is a notch a part of this notch will be masked by the frame of the glazing and thus non-functional for the vision system. If the hole is closed is too close to the edge the same applies.

If the through-hole of the second glass sheet is closed, the edge of the hole closest to the edge face of the glazing (preferably upper longitudinal edge and particularly in a central zone) is spaced apart from this edge face of the glazing (of the second sheet) preferably by at least 2 cm or 3 cm and better still 5 cm.

The through-hole of the second glass sheet may be in the central zone of the upper longitudinal edge of the windshield, the usual zone of the internal rear view mirror (adjacent to the hole or rear view mirror eliminated depending on the vehicles), zone where the masking layer on face F2 and/or FA is generally thicker than on the lateral zones along the upper edge (passenger, driver).

Preferably, the through-hole of the second glass sheet has a cross-section, particularly trapezoidal or of disk or oval type,—smaller by at least 5 cm (adapted to the size of the infrared vision system size for example)—and preferably larger (in particular large side or diameter) of no more than 40 cm, 30 cm, 25 cm, 20 cm (for mechanical aspects) and preferably the anti-reflective coating occupies a surface encompassing the through-hole of the second glass sheet and with a length of at most 40 cm or 30 cm.

In particular, the cross section is a quadrilateral, particularly a rectangle or trapezoid, with:

a first so-called upper (large) longitudinal side or edge (closest to the edge face of the upper longitudinal edge of the glazing) preferably parallel to the edge face of the upper longitudinal edge of the glazing and of a length preferably of at most 30 cm, 20 cm or 15 cm or 12 cm and particularly spaced apart by at least 5 cm or 6 cm from the edge face (of the upper longitudinal edge of the glazing)

a second so-called lower (large) longitudinal side or edge (the farthest from the edge face of the upper longitudinal edge of the glazing, closest to the central zone) preferably parallel to the edge face of the upper longitudinal edge of the glazing and of a length preferably no more than 35 cm or 30 cm or 25 cm or 20 cm and preferably larger than that of the first large side;

of a height (between these first and second large sides) preferably of at least 5 cm and even of at most 15 cm.

Alternatively the through-hole passing through the second glass sheet is along a lateral edge.

In the case of a rear window, the through-hole passing through the second glass sheet may be peripheral along a longitudinal edge (particularly upper) or lateral edge.

The glazing according to the invention may comprise an opaque masking layer particularly an enamel (black etc) on face F2 and/or on face Fa (in particular on Fa an ink particularly black etc), and in particular the opaque masking layer is absent or has a gap in line with the infrared transmission zone (particularly, first, second or third configuration).

The opaque masking layer may be on the edge of the infrared transmission zone (of the through-hole of the second glass sheet if need be), in particular in the peripheral and even central zone and preferably along the longitudinal edge of the glazing, the anti-reflective coating (particularly the porous silica layer with a potential dense silica underlayer) being distant or in contact with the opaque masking layer.

The masking layer has for example a gap at least in the central zone in line with the infrared transmission zone (of said through-hole of the second glass sheet if needed) which preferably protrudes by at most 30 mm or 20 mm or 10 mm or 5 mm in the infrared transmission zone (in said through-hole of the second glass sheet if needed).

This masking layer masks the infrared vision system and for example its casing.

A masking layer may be a printed layer on the lamination interlayer for example on the PVB.

The anti-reflective coating (particularly the porous silica layer with a possible underlayer of dense silica) may also be spaced apart from the masking layer (for example which is on face F2 particularly of the enamel) or at least does not cover same.

The opaque masking layer is preferably a continuous layer (flattened with a solid edge or as a variant a gradient edge (set of patterns).

The masking layer can be at 2 mm or 3 mm (less than 5 mm) from the edge face of the glazing (closest).

The masking layer can be a band framing the glazing (windshield etc.) particularly in black enamel. A gap is thus created in this masking layer.

Another masking layer (particularly black enamel etc.) may be on face F3 or F4 particularly facing toward the masking layer (and even of identical nature, for example a particularly black enamel).

The glazing may comprise (cumulatively with the masking layer in face F2 or on Fa) an opaque masking layer in face F4 and in particular the opaque masking layer is absent (at least in the central region) or has a gap in line with the infrared transmission zone (of said through-hole of the second glass sheet if needed), and particularly the anti-reflective coating on face F4 (first laminated glazing configuration) is preferably spaced apart from or partially under this masking layer.

In the infrared transmission zone with the anti-reflective coating, the glazing may comprise on the face F2 side a selective filter absorbent in the visible region and transparent at the first working wavelength LB1 and/or at the second working wavelength LB2, the glazing then having a total transmission of no more than 10.0%, 5.0%, or 1.0% or 0.5% in the visible region particularly at least at a reference value in a range of 400 nm to 700 nm.

The selective filter preferably has an infrared transmission of at least 90% at LB1 and/or LB2 and/or diminishes by no more than 5% or 3 or 1% infrared transmission at LB1 and/or LB2 with respect to a glazing without selective filter).

The selective filter may be a camouflaging coating (functional) particularly on face F2, and even protruding under face F3 and the anti-reflective coating preferably is distant from face F2, in particular on the piece (configuration k) or on face F4 (configuration j).

The camouflaging coating is for example a solid layer, or even a layer with discontinuities, for example forming a (micro or nano)mesh.

This camouflaging coating may be of any nature: organic or mineral, ink, varnish (particularly a coloring layer, detailed below), it may be located at said infrared transmission zone (of said through-hole of the second glass sheet if need be) or be more extensive, for example to conceal one or other sensors, as detailed below.

This camouflaging coating may protrude beyond the infrared transmission zone (of said through-hole of the second glass sheet if need be) for example by at most 50 mm or better still by at most 20 mm between face F2 and face F3 in a (glazed) zone, referred to as edge zone of said hole and have a different shape for the filter and the through-hole, for example.

The selective filter can therefore be:

a colored polymer film (opaque in mass), for example with a submillimetric thickness particularly of no more than 0.6 mm or 0.3 mm or 0.2 mm, adhered or in adhesive contact with face F2 (under the potential through-hole), or a camouflaging coating (functional) on a polymer film (for example with a thickness particularly of no more than 0.3 mm or 0.2 mm), adhered to in adhesive contact with face F2 (under the optional through-hole).

In configuration j) the colored polymer film (opaque in mass) is for example under the piece preferably made of glass. The colored polymer film (opaque in mass), is adhered for example by an adhesive sensitive to pressure to the piece.

In configuration i) the colored polymer film (opaque in mass) is for example in the lamination interlayer particularly PVB.

The colored or transparent polymer film and/or the most transparent possible at LB1 and/or LB2 camouflaging coating are selected.

Preferably, the selective filter (by camouflaging coating on face F2 or on a polymer film or by colored polymer film adhered to or in adhesive contact with face F2) has essentially the same color (black etc) and/or optical density than the peripheral opaque masking layer (black etc) particularly in face F2. For example the optical density difference between the selective filter and the opaque masking layer in face F2 is at most 5%, 3%, 2% and they even are of the same color.

The selective filter (for example the camouflaging coating on face F2 or on a polymer film for example adhered to face F2 or by adhered colored polymer film or in adhesive contact with face F2) may be local, in the region of the infrared transmission zone (occupying a fraction of the surface of the glazing) and occupy less than 30%, 10%, 5% of the glazing.

The selective filter (for example the coating on face F2 or on a polymer film or by colored polymer film adhered to or in adhesive contact with face F2) may have any general shape rectangular, square, identical and even homothetic to the shape of the through-hole.

The distance between the upper longitudinal edge and the selective filter may be at most 30 mm, 20 mm 15 mm and even 10 mm.

In the second glazing configuration, the selective filter on face F2 (camouflaging coating) and/or comprising a film (polymer), adhered to or in adhesive contact with face F2, may surround the chosen closed through-hole (present over the whole periphery of the closed hole) for example of a similar or homothetic shape to the hole. The selective filter may also be a simple geometric shape (rectangle, etc.) in which the closed hole is inscribed.

So as not to identify the LIDAR zone, the selective filter preferably does not form an isolated (substantially) opaque zone (which is visible and identifiable from face F1), adjacent to a transparent zone of the laminated glazing over all or part of the periphery thereof. The selective filter can therefore

- be integrated in a masking/decorative zone (such as that which is customary at the periphery of the glazing) provided with an (opening or closed) gap
- be adjacent to this masking zone
- and/or extend under face F3 to form all or piece of this decorative zone.

In one embodiment, the selective filter comprises a coloring layer in a compound comprising a matrix (organic, polymeric, mineral or hybrid) and a coloring agent dispersed in said matrix, said coloring agent absorbing (substantially all) the light located in said visible region and being (substantially) transparent at said first and/or second working wavelength LB1 and/or LB2, which coloring layer forms in the infrared transmission zone (of said optional trough-hole of the second glass sheet) the camouflaging coating already described:

- on face F2
- or on the lamination interlayer, on face FA or FB side, preferably made of PVB, in particular ink further comprising PVB particles
- or on a polymer film (which is transparent in the visible region and at the first and/or working wavelength LB1 and/or LB2), particularly polyethylene terephthalate (PET), in adhesive contact or adhered to F2 or in adhesive contact or adhered to the piece in said through-hole of the second glass sheet, of a preferably sub-millimeter thickness particularly of at most 0.6 mm or 0.3 mm, 0.15 mm, preferably connected to face F2.

The coloring layer may be of sub millimeter thickness and even of at most 20 μm.

The compound of the coloring layer may be polymeric or an organic-mineral hybrid. The compound/polymer matrix of the coloring layer is selected from monomers, oligomers, or polymers comprising at least one methacrylate function, epoxides, varnishes consisting of dispersed particles of PVB, latex, polyurethane or acrylate.

The coloring layer may contain any pigment or dye having a higher transmittance in the infrared than its transmittance in the visible region, such as a near-infrared black ink which substantially absorbs visible wavelengths and transmits those in the near infrared. For example, the coloring layer may contain dyes or inks such as Spectre™ inks, for example Spectre™ 100, 110, 120, 130, 140, 150, or 160 (Epolin, Newark, NJ); Mimaki inks, for example Mimaki ES3, SS21, BS3, SS2, or HS (Mimaki Global, Tomi-city, Nagano, Japan); or Seiko inks, for example Seiko 1000, 1300, SG700, SG740, or VIC (Seiko Advance Ltd., Japan) or else black ink IR9508 from MingBo anti Forgery Technology Co ltd.

The coloring layer may contain one or more components of black, cyan, magenta or yellow dye.

The coloring layer may include dyes or pigments or both. The coloring layer may include Lumogen® Black FK 4280 or Lumogen® Black FK 4281 (BASF, Southfield, MI).

Preferably, in the coloring layer:

- the dye is selected from Sudan Black BR or Nigrosine Solvent black 5, and is preferably Sudan Black BR or Nigrosine Solvent black 5, and preferably is Sudan Black B®
- the dye represents between 0.1 and 10% by weight of the layer, preferably between 0.2 and 3% by weight of the layer.

The coloring layer may be a varnish of less than 30 μm.

For the coloring layer, it is possible to adjust the layer thickness or the percentage by weight of dye, in particular to less than 1%, 5% to 20%, 30%. The selective filter may comprise a colored (bulk opaque) polymer film preferably of submillimiter thickness such as a PET loaded in the bulk thereof with dyes by a "deep-dyeing" process by "roll-to-roll", particularly by submerging in a hot bath with the dyes. The final concentration of dye must be sufficient to provide opaqueness in the visible region. Reference may be made to patent WO9307329 or U.S. Pat. No. 5,162,046.

It is possible, on a (transparent or colored) polymer film such as PET to place a coloring layer per main face.

It is possible to combine a polymer film such as PET, bulk dyed, and a coloring layer on this film, another polymer film such as PET, on the remaining PVB facing said hole or on face F2.

It is possible to provide different extents for the selective filter under face F3 and particularly spaced apart from the piece in the through-hole of the second glass sheet:

- the selective filter extends under face F3 beyond said optional through-hole of the second glass sheet, from the outside extends a masking layer or masks a gap of a peripheral masking layer,
- the selective filter extends under face F3 beyond said optional through-hole of the second glass sheet, particularly from the outside extends a masking layer or masks a gap of a peripheral masking layer, the selective filter has at least one opening or local discontinuity for allowing the passage of light rays, particularly for at least one additional sensor in particular a sensor of a visible camera or thermal camera, in particular a camera attached to a holed plate in face F4 for allowing said light or electromagnetic rays (thermal camera) to pass.

The selective filter may be defined by a L*1, a*1 b*1, defined in the L*a*b* CIE 1976 color space. The masking layer of color C1 is also defined by a L*2, a*2 b*2 with a color difference $\Delta E^*$ given by the following formula:

$$\Delta E^* = \sqrt{(\Delta L^{*2} + \Delta a^{*2} + \Delta b^{*2})}.$$

Preferably, $\Delta E^* < 4$, better still $\Delta E^* < 2$ (discerned with difficulty by the human eye), even better still $\Delta E^* < 1$ (not discerned by the human eye).

In particular, the edge face of the selective filter is spaced apart (laterally) by at most 100 μm from the gap (from the masking layer) in order not to see the interruption in opaqueness with the naked eye and the edge face of the masking layer forming the edge of the gap is spaced apart (laterally) by at most 500 μm from the wall of the through-hole (of the second glass sheet) if it is desired to limit the extent of the selective filter.

In the specific case in which the masking layer is an ink deposited (printed) on the lamination interlayer (PVB), it may be preferred for the ink to be spaced apart from the edge of said through-hole by at least 1 cm in order to prevent delamination.

In particular, the selective filter is a camouflaging coating on face F2 and is covered by the masking layer particularly coverage over at most 50 mm.

In particular, the selective filter is a camouflaging coating on face F2 and the masking layer is on one of faces FA or FB, particularly coverage over at most 50 mm.

In particular, the selective filter is a camouflaging coating on face FA or FB is covered by the masking layer, for example an ink, particularly coverage over at most 50 mm.

In particular, the selective filter is a camouflaging coating on one of faces FA or FB and the masking layer is on the other of faces FA or FB particularly coverage over at most 50 mm.

In particular, the selective filter is a camouflaging coating on one of faces F2, FA or FB and the masking layer is on face F3 or F4 particularly coverage (in projection) over at most 50 mm.

The glazing may comprise metallic wires particularly heating wires on the face Fb side particularly anchored on face Fb and preferably absent in the infrared transmission zone (said through-hole of the second glass sheet if need be).

The heating wires in particular have a thickness less than or equal to 0.1 mm preferably of copper, tungsten, gold, silver or aluminum or alloys of at least two of these metals.

For the glass of the first glass sheet and/or of the second glass sheet, preferably a soda-lime-silica type glass is used.

The interior and/or exterior glass may have undergone a chemical or heat treatment of the hardening or annealing type or may have undergone tempering (particularly in order to obtain better mechanical strength) or can be semi-tempered.

The glass of the first glass sheet and/or of the second glass sheet is preferably of the float glass type, that is to say obtainable by a method consisting in pouring molten glass onto a bath of molten tin (called a "float" bath). The terms "atmosphere" and "tin" faces are understood to mean those faces that have been in contact with the atmosphere in the float bath and in contact with the molten tin respectively. The tin face contains a small surface amount of tin that has diffused into the structure of the glass.

The first glass sheet can for example be a soda-lime-silica glass such as Saint-Gobain Glass's Diamant®, or Pilkington's Optiwhite®, or Schott's B270®, or AGC's Sunmax® or of other composition described in document WO04/025334. The Planiclear® glass from the Saint-Gobain Glass company can also be chosen.

With ordinary natural raw materials, the total content by weight of iron oxide is of the order of 0.1% (1000 ppm). To reduce the iron oxide content, particularly pure raw materials can be selected.

In the present invention, the $Fe_2O_3$ content (total iron) of the first glass sheet and even of the piece is preferably less than 0.015%, even less than or equal to 0.012%, particularly 0.010%, in order to increase the near-infrared transmission of the glass. The $Fe_2O_3$ content is preferably greater than or equal to 0.005%, particularly 0.008% so that the cost of the glass is not a disadvantage.

In order to further increase the infrared transmission of the first glass sheet and even of the piece in the infrared region, the ferrous iron content can be reduced in favor of the ferric iron content, thus oxidizing the iron present in the glass. Thus, the desire is for glasses having the lowest possible redox, ideally zero or nearly 0. This number can vary between 0 and 0.9, zero redoxes corresponding to a totally oxidized glass.

Glasses comprising low quantities of iron oxide, particularly less than 200 ppm, even less than 150 ppm, have a natural tendency to have high redoxes, greater than 0.4, even 0.5. This tendency is probably due to the displacement of the oxidation-reduction equilibrium of the iron based on the content of iron oxide.

The redox of the first glass sheet is preferably greater than or equal to 0.15, and particularly between 0.2 and 0.30, particularly between 0.25 and 0.30. In fact, excessively low redoxes contribute to reducing the working life of the furnaces.

In the glasses according to the invention (first and second sheet), the silica $SiO_2$ is generally maintained within narrow limits for the following reasons. Above 75%, the viscosity of the glass and its aptitude for devitrification increase greatly, which makes its melting and pouring onto the molten tin bath more difficult. Below 60%, particularly 64%, the hydrolytic resistance of the glass decreases rapidly. The preferred content is between 65 and 75%, particularly between 71 and 73%.

Said first glass sheet and even the piece can have a chemical composition that comprises the following constituents in a content varying within the limits by weight defined hereinafter:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | 0.1-0.4% |
| $Fe_2O_3$ (total iron) | 0 to 0.015%, |
| And redox | 0.1-0.3. |

Throughout the text, the percentages are percentages by weight.

The glass sheets are preferably formed by floating on a tin bath. Other types of forming methods can be used, such as drawing methods, down-draw method, lamination method, Fourcault method, etc.

The glass composition of the first glass sheet (and even the part) may comprise, other than the inevitable impurities contained particularly in the raw materials, a small proportion (up to 1%) of other constituents, for example agents aiding in the melting or refining of the glass (CI . . . ), or even elements resulting from the dissolving of the refractories used in the construction of the furnaces (for example $ZrO_2$). For the reasons already mentioned, the composition according to the invention preferably does not comprise oxides such as $Sb_2O_3$, $As_2O_3$ or $CeO_2$.

The composition of the first glass sheet (and even the part) preferably does not comprise any infrared absorbing agent (particularly for a wavelength comprised between 800 and 1800 nm). In particular, the composition according to the invention preferably does not contain any of the following agents: oxides of transition elements such as CoO, CuO, $Cr_2O_3$, NiO, $MnO_2$, $V_2O_5$, rare earth oxides such as $CeO_2$, $La_2O_3$, $Nd_2O_3$, $Er_2O_3$, or coloring agents in elemental state such as Se, Ag, Cu. Among the other agents also preferably excluded are oxides of the following elements: Sc, Y, Pr, Sm, Eu, Gd, Tb, Dy, Ho, Tm, Yb, Lu. These agents often have a very powerful undesirable coloring effect, appearing at very small quantities, sometimes on the order of a few ppm or less (1 ppm=0.0001%). Their presence thus very greatly reduces the transmission of the glass.

Preferably, the first glass sheet has a chemical composition that comprises the following constituents in an amount varying within the limits by weight as defined hereinafter:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | >0.2-0.4% |
| $Fe_2O_3$ | 0 to 0.015%, |
| (total iron) | |
| And redox | 0.2-0.30. |

The first glass sheet (and even the piece) can have a chemical composition that comprises the following constituents in a content varying within the limits by weight defined hereinafter:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | 0.1-0.4% |
| $Fe_2O_3$ | 0 to 0.02%, |
| (total iron) | |
| And redox | 0.15-0.3. |

In the present invention, the $Fe_2O_3$ content (total iron) is preferably less than 0.015%, even less than or equal to 0.012%, particularly 0.010%, and this in order to increase the near infrared transmission of the glass. The $Fe_2O_3$ content is preferably greater than or equal to 0.005%, particularly 0.008% so that the cost of the glass is not a disadvantage.

The redox is preferably greater than or equal to 0.15, and particularly between 0.2 and 0.30, particularly between 0.25 and 0.30. In fact, excessively low redoxes contribute to reducing the working life of the furnaces.

In the glasses according to the invention, the silica $SiO_2$ is generally maintained within narrow limits for the following reasons. Above 75%, the viscosity of the glass and its aptitude for devitrification increase greatly, which makes its melting and pouring onto the molten tin bath more difficult. Below 60%, particularly 64%, the hydrolytic resistance of the glass decreases rapidly. The preferred content is between 65 and 75%, particularly between 71 and 73%.

Other preferred compositions according to the invention (for the first glass sheet and even the part) are reproduced hereinafter:

| | |
|---|---|
| $SiO_2$ | 65-75% |
| $Al_2O_3$ | 0-3% |
| CaO | 7-12% |
| MgO | 2-5% |
| $Na_2O$ | 10-15% |
| $K_2O$ | 0-5% |
| $SO_3$ | 0.1-0.3% |
| $Fe_2O_3$ | 0 to less |
| (total iron) | than 0.015%, |
| And redox | 0.1-0.3. |

Other preferred compositions according to the invention (for the first glass sheet and even the part) are reproduced hereinafter:

| | |
|---|---|
| $SiO_2$ | 65-75% |
| $Al_2O_3$ | 0-5% |
| CaO | 7-12% |
| MgO | 1-5% |
| $Na_2O$ | 10-15% |
| $K_2O$ | 0-5% |
| $SO_3$ | 0.2-0.4% |
| $Fe_2O_3$ | 0 to less |
| (total iron) | than 0.015%, |
| And redox | 0.1-0.3. |

Without departing from the scope of the invention, the interlayer clearly may comprise several different types of laminations made of thermoplastic material, for example, with different hardnesses in order to provide an acoustic function, as described, for example, in publication U.S. Pat. No. 6,132,882, particularly a set of PVB laminations with different hardnesses. Similarly, one of the glass sheets can be thin compared to the thicknesses conventionally used.

According to the invention, the interlayer can have a wedge-shape, particularly in view of an HUD (Head Up Display) application. One of the laminations of the interlayer can also be batch-tinted.

As a common lamination interlayer, other than PVB, a flexible polyurethane PU, a thermoplastic without plasticizer such as ethylene-vinyl acetate copolymer (EVA), an ionomer resin can be cited. These plastics have a thickness, for example, of between 0.2 mm and 1.1 mm, particularly 0.3 and 0.7 mm.

The lamination interlayer can comprise another functional plastic film (transparent, clear or tinted), for example, a polyethylene terephthalate PET film supporting a layer that is athermic, electrically conductive, etc., for example, a PVB/functional film/PVB between faces F2 and F3.

The transparent plastic film can have a thickness of between 10 and 100 µm. The transparent plastic film can more broadly be made of polyamide, polyester, polyolefin (PE: polyethylene, PP: polypropylene), polystyrene, polyvinyl chloride (PVC), polyethylene terephthalate (PET), poly(methyl methacrylate) (PMMA), polycarbonate (PC). A clear film is preferred, in particular PET.

Use may be made for example of a clear coated PET film, for example XIR from Eastman, a coextruded PET/PMMA film, for example of the SRF 3M® type, but also numerous other films (for example made of PC, PE, PEN, PMMA, PVC), which are visually as transparent as possible and which are not modified, in the autoclave, as regards their surface and their consistency.

The lamination interlayer preferably is not tinted (colorless), extra clear with an infrared transmission of at least 90% or 95% at LB1 and/or LB2 and/or diminishes by no more than 5% or 3 or 1% infrared transmission at LB1 and/or LB2 with respect to a monolithic glazing.

In order to limit heating in the passenger compartment or to limit the use of air conditioning, at least one of the glass sheets (preferably the exterior glass) is tinted, and the laminated glazing can also comprise a layer which reflects or absorbs solar radiation, preferably in face F4 or in face F2 or F3, in particular a transparent electrically conductive oxide layer, known as a TCO layer, (on face F4) or even a stack of thin layers comprising at least one TCO layer, MCW or stacks of thin layers comprising at least one silver layer (on F2 or F3), the or each silver layer being arranged between dielectric layers.

The layer (silver) on face F2 and/or F3 and TCO layer on face F4 can be combined.

The TCO layer (of a transparent electrically conductive oxide) is preferably a layer of fluorine-doped tin oxide ($SnO_2$:F) or a layer of mixed indium tin oxide (ITO).

The glazing may thus comprise on face F2 or F3 a functional layer extending on all or piece of the glazing particularly a transparent layer particularly electrically conductive (athermic), optionally heating, in particular a silver stack or TCO as mentioned above, or even an opaque masking layer, particularly an enamel, functional layer at said first working wavelength LB1 and/or at said second working wavelength LB2 which is absent from the infrared transmission zone (absent from said through-hole of the second glass sheet if need be), at least in the central zone, and for example present on the edge of the infrared transmission zone (of the through-hole of the second glass sheet between face F2 and Fa).

The anti-reflective coating preferably being distant from the functional layer.

In order to avoid particularly fogging or condensation, the glazing may comprise (as a functional coating) a transparent, heating, electrically conductive layer, transparent at said first working wavelength LB1 and/or at said second working wavelength LB2, particularly made of a transparent conductive oxide, and which is located in the infrared transmission zone (local heating zone), for example (functional coating) on face F2, (functional coating) on a polymer film on or within the lamination interlayer or even (functional coating) on the piece in the through-hole of the second glass sheet (in configuration k)). The heating layer (functional coating) is preferably supplied with at least two power supplies, in particular two local busbars or flat plug(s), preferably hidden from the outside and on two opposite edges of the heating layer.

The invention also relates to a vehicle (preferably a road vehicle) comprising the glazing (for a vehicle) as previously described, in particular laminated glazing, windshield.

The invention also relates to a device, which comprises:
the glazing (for a vehicle) as previously described, in particular laminated glazing, windshield, an infrared vision system (like a LIDAR) at said first working wavelength LB1 and/or at said second working wavelength LB2, even multispectral therefore also in the visible region, particularly between 500 and 600 nm, disposed in the passenger compartment behind said glazing so as to send and/or receive radiation after passing through the glazing at the infrared transmission zone.

The infrared vision system (LIDAR) can be of different technologies. It makes it possible to measure the vehicle's environment by determining the distance of the object closest to the vehicle in a wide range of angular directions. Thus, the vehicle's environment can be reconstituted in 3D. The technology employed is based on sending a light beam and receiving it after it has diffusely reflected off an obstacle. This can be done by a rotating source, scanned by electromechanical micro-systems (MEMS), or by a fully solid system. A single flash of light can thus illuminate the whole environment.

For all these technologies, the light must pass through the glazing twice, when outgoing and when incoming, which explains the necessity to have a glazing with excellent transparency at the working wavelength LB1 and/or LB2 of the LIDAR.

The speed can also be measured with DOPPLER technology.

The infrared vision system (LIDAR) is preferably spaced apart from the anti-reflective coating.

In the second glazing configuration, the piece with anti-reflective coating according to the invention is preferably spaced apart from the infrared vision system (LIDAR) and/or does not serve for the attachment of same. The infrared vision system (LIDAR) may be facing or offset from said through-hole (and from the piece in said through-hole), for example an optical system is between the piece and the infrared vision system (LIDAR).

The infrared vision system (LIDAR) is for example attached via face F4 and/or the bodywork, the roof trim. The infrared vision system (LIDAR) can be offset.

The infrared vision system (LIDAR) is for example integrated in a plate or a multifunction base able to (designed to) optimize its positioning relative to the windshield (and optionally the part) by being adhered to face F4.

Some advantageous but non-limiting embodiments of the present invention are described hereafter, which of course can be combined as appropriate.

Figure 1:
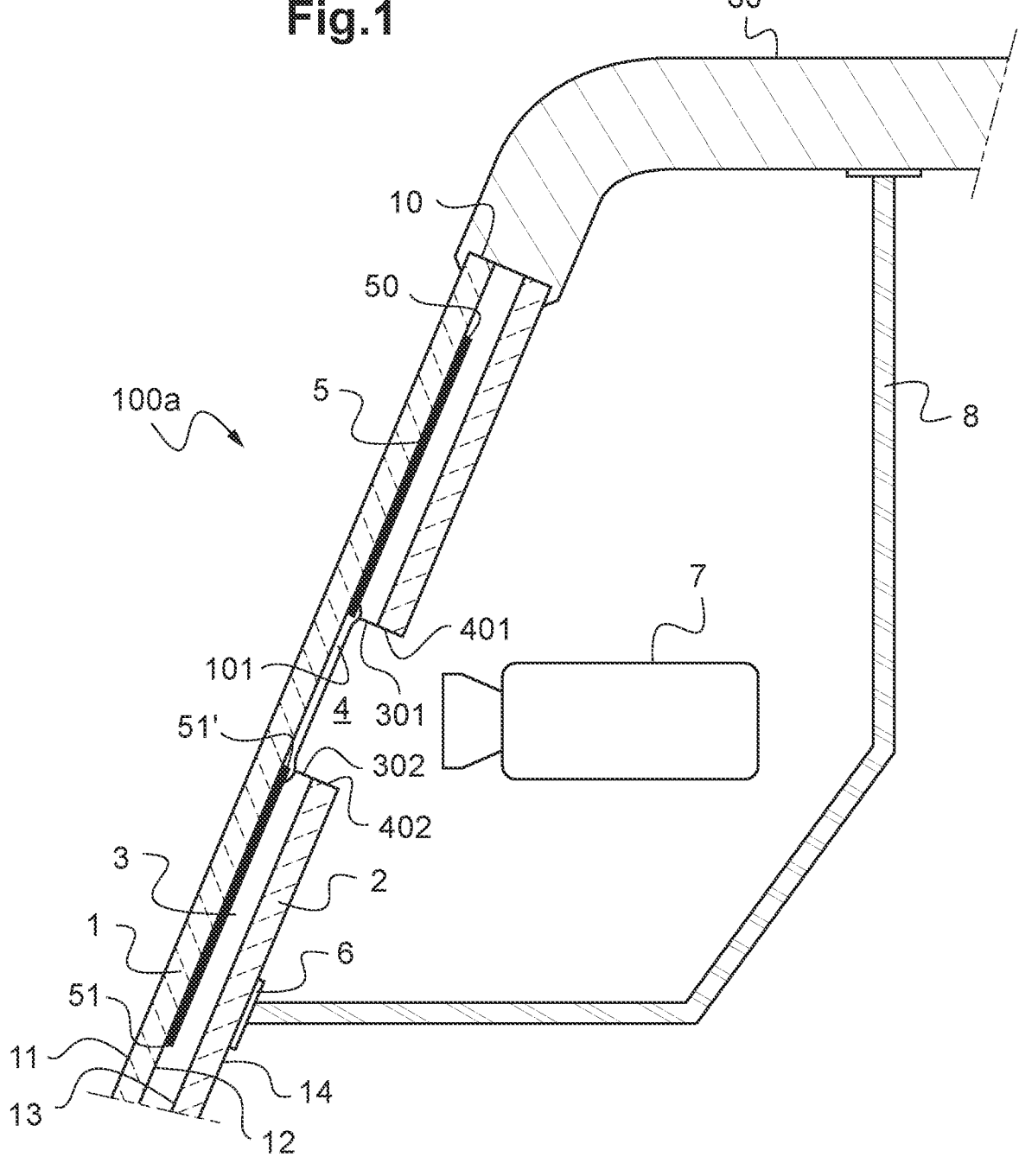
FIG. 1 shows a schematic sectional view of a windscreen 100a in a first embodiment of the invention with an infrared vision system such as a LIDAR.
Figure 2A:
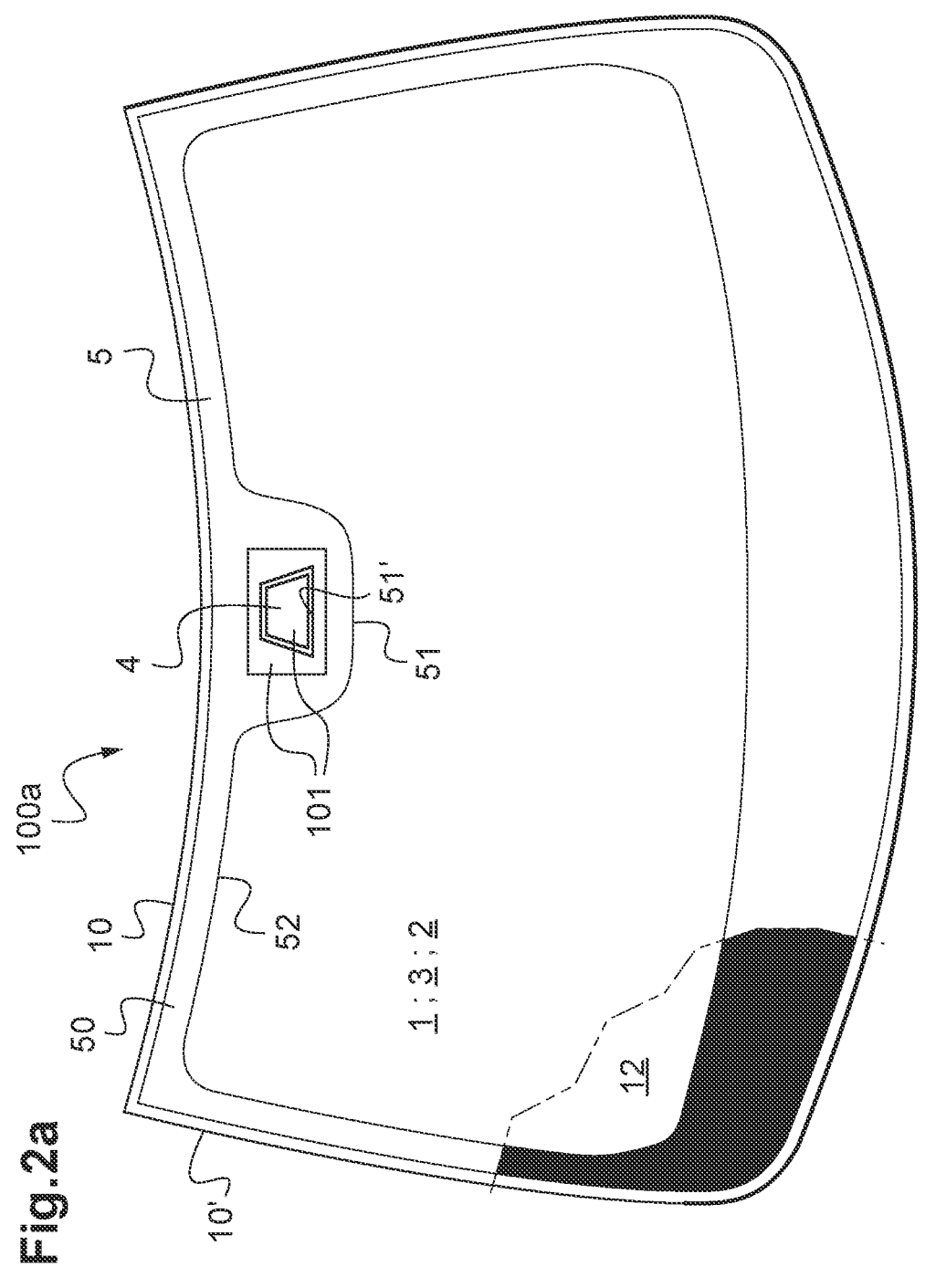
FIG. 2a shows a schematic front view (passenger compartment side) of the windshield 100a of FIG. 1.
Figure 2B:
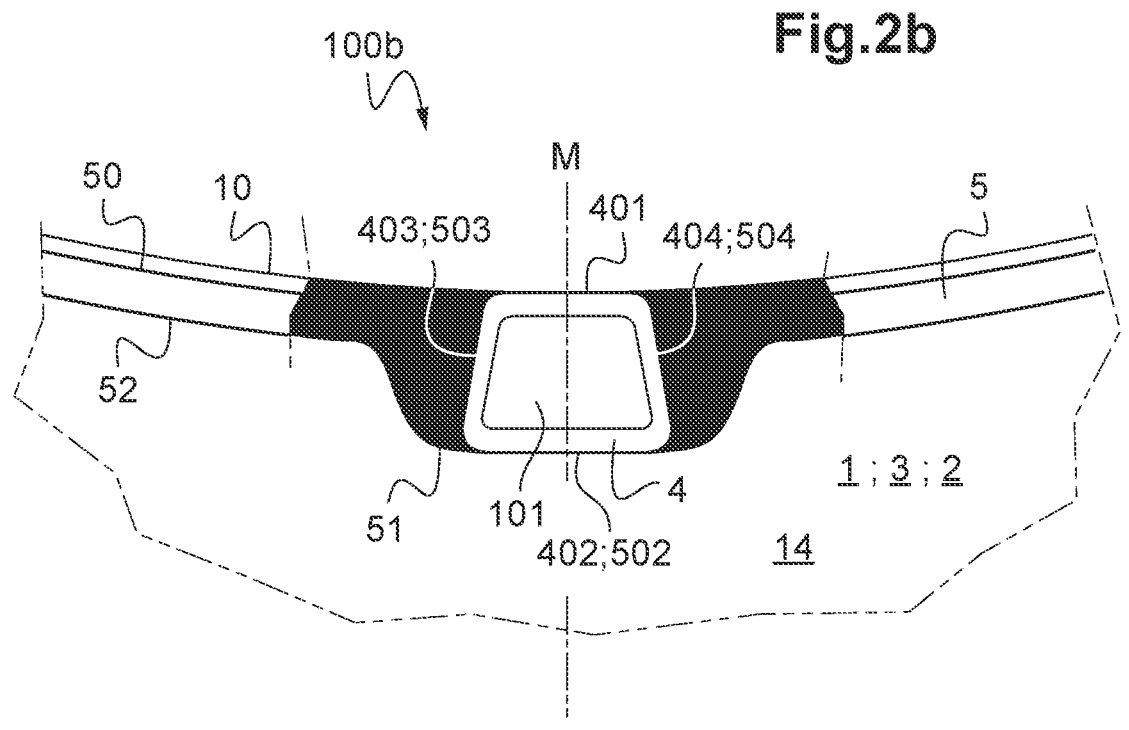
FIG. 2b shows a schematic front view (passenger compartment side) of the windscreen 100b in a first variant of the first embodiment of the invention.
Figure 2C:
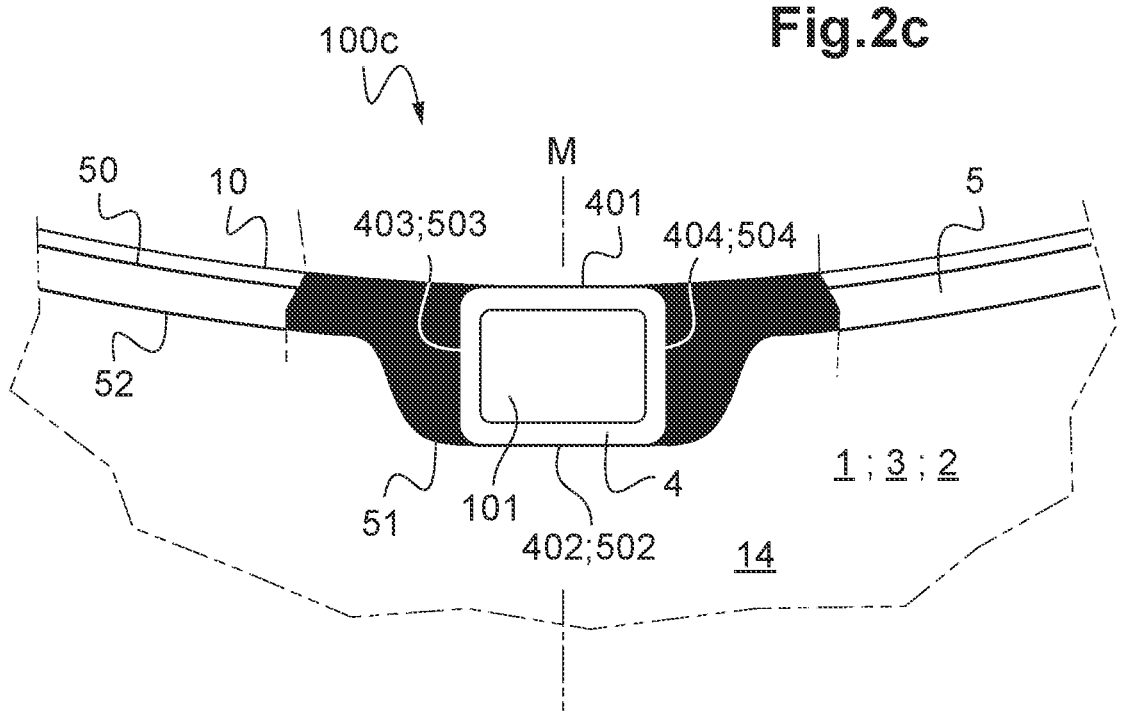
FIG. 2c shows a schematic front view (passenger compartment side) of the windscreen 100c in a second variant of the first embodiment of the invention.

FIG. 1 shows schematically in cross sectional view a windshield 100*a* according to the invention, with an infrared vision system such as a LIDAR at 905 nm or 1550 nm. It can also be a multi-spectral system that can work in the visible region and up to 905 nm or 1550 nm or even 1800 nm. FIG. 2*a* shows a front view (passenger compartment side) of the windshield 100*a* of FIG. 1. FIG. 2*b* shows a front view (passenger compartment side) of the windshield 100*b* as a first variant of the first embodiment of the invention. FIG. 2*c* shows a schematic front view (passenger compartment side) of the windshield 100*c* as second variant of the first embodiment of the invention.

This vision system 7 is placed behind the windshield facing a zone that is preferably located in the central and upper piece of the windshield. In this zone, the infrared vision system 7 is oriented at a certain angle with respect to the surface of the windshield (face F2). In particular, the LIDAR may be oriented directly toward the image capture zone, in a direction that is nearly parallel to the ground, that is to say slightly inclined toward the road. In other words, the LIDAR 7 may be oriented toward the road at a slight angle with a vision field adapted to fulfill its functions.

The windshield 100 is a conventional laminated glazing comprising:

an external glass sheet 1, with an exterior face F1 and an interior face F2 and an internal glass sheet 2, for example with a thickness of 1.6 mm or even less, with an exterior face F3 and the interior face F4 on the passenger compartment side the two glass sheets being bonded to one another by an interlayer made of thermoplastic material 3, most usually polyvinyl butyral (PVB), preferably clear, of sub-millimeter thickness possibly having a transverse cross-section decreasing in corner shape from top to bottom of the laminated glazing, for example a PVB (RC41 from Solutia or Eastman) of about 0.76 mm thickness, or alternatively if necessary an acoustic PVB (three-layer or four-layer), for example about 0.81 mm thick, for example an interlayer in three PVB sheets.

In a conventional and well-known way, the windshield is obtained by hot lamination of the elements 1, 2 and 3. A clear 0.76 mm or even 0.38 mm PVB is selected.

The first glass sheet 1, particularly silica-based, soda-lime-based, silica-soda-lime-based (preferably), alumino-silicate-based, or borosilicate-based, has a total iron oxide content by weight (expressed in the form $Fe_2O_3$) of at most 0.05% (500 ppm), preferably of at most 0.03% (300 ppm) and at most 0.015% (150 ppm) and particularly greater than or equal to 0.005%. The first glass sheet can preferably have a redox greater than or equal to 0.15, and particularly between 0.2 and 0.30, particularly between 0.25 and 0.30. Particularly a 1.95 mm OPTWHITE glass is selected.

The second glass sheet 2 particularly silica-based, soda-lime-based, preferably soda-lime-silica-based (like the first glass sheet), or aluminosilicate-based, or borosilicate-based.

It has a total iron oxide content by weight of at least 0.4% and preferably of at most 1.5%. The second glass sheet may have a redox between 0.22 and 0.35 or 0.30. The glasses of the applicant called TSAnx (0.5 to 0.6% iron) TSA2+, TSA3+ (0.8 to 0.9% iron), TSA4+ (1% iron), TSA5+, for example green, can be particularly mentioned. For example a TSA3+ glass of 1.6 mm is selected.

The first glass sheet 1 comprises, on face F2, an anti-reflective coating 101 in the infrared region with a free surface (not covered by the lamination interlayer and the second glass sheet) by means of a total through-hole 4 in the thickness of the interlayer (interlayer through-hole) delimited by the upper 301 and lower 302 walls and in the thickness of the second glass sheet (through-hole) thus hole delimited by the upper 401 and lower 402 walls. The total hole defines the limits (maximum) of an infrared transmission zone for the LIDAR.

The coating 101 is antireflective at the first working wavelength LB1 which is 905 nm and has a thickness which is 165 nm±50 nm. In the infrared transmission zone, the glazing with said anti-reflective coating 101 has a total transmission of at least 85% at the first working wavelength LB1.

Alternatively, the coating 101 is antireflective at the second working wavelength LB2 which is 1550 nm and has a thickness which is 275 nm±50 nm. In the infrared transmission zone, the glazing with said anti-reflective coating 101 has a total transmission of at least 85% at the second working wavelength LB2.

Said anti-reflective coating preferably is a porous silica layer.

In the case of this example, the deposition method used is the roller method. The dry extract of the solution is fixed at 3.2% and the porosity of the solution at 45%. The refraction index of the porous silica layer for this example is about 1.3 at 550 nm.

The silica precursor (tetraethyl orthosilicate (TEOS)) is hydrolyzed in water at pH2 (addition of hydrochloric acid) at room temperature. Then, a large volume of pH2 water is added in order to make up the dry extract of the solution. A volume of organic pore-forming agents (particles of poly (methyl methacrylate (PMMA) of 70 nm) is added to the solution. These pore-forming agents are for example eliminated by heat treatment preferably at more than 300° C. or 400° C. so that the glass is annealed or even tempered.

More specifically Table 1 below contains the transmission and reflection values measured at angle of incidence of 0° (thus normal) and at angle of incidence of 8° (at 8° of normal) for:

a glazing R with a first glass sheet which is a reference 1.95 mm Optiwhite glass without anti-reflective coating a glazing A with a first glass sheet which is a 1.95 mm Optiwhite glass with the anti-reflective coating optimized in the visible region a glazing B with a first glass sheet which is a 1.95 mm Optiwhite glass with the anti-reflective coating optimized for LB1 (underlined values)

a glazing C with a first glass sheet which is a 1.95 mm Optiwhite glass with the anti-reflective coating optimized for LB2 (underlined values).

TABLE 1

| Example | TL at 905 nm at 0° (%) | TL at 1550 nm at 0° (%) | RL at 905 nm at 8° (%) | RL at 1550 nm at 8° (%) | thickness (nm) |
|---|---|---|---|---|---|
| R | 91 | 91.8 | 8.0 | 7.8 | — |
| A | 92.6 | 92.4 | 6.0 | 7.1 | 90 |
| B | 94.1 | 94.0 | 4.4 | 5.4 | 180 |
| C | 92.4 | 94.9 | 5.9 | 4.4 | 265 |

Configuration B is appropriate for the 905 nm wavelength with a light transmission increase of more than +3% and a reduction of the light reflection of –3% (uncertainty of measurement: +0.2%). The thickness of the anti-reflective coating was evaluated at about 180 nm.

As for configuration C, it is appropriate for the 1550 nm wavelength with a light transmission gain and a reduction of the light reflection. The thickness of the coating was evaluated at about 265 nm.

More specifically Table 2 below contains the transmission and reflection values measured at angle of incidence of 60° for glazing R, glazing A, glazing B and glazing C.

TABLE 2

| Example | TL at 905 nm at 60° (%) | TL at 1550 nm at 60° (%) | RL at 905 nm at 60° (%= | RL at 1550 nm at 60° | thickness (nm) |
|---|---|---|---|---|---|
| R | 82.2 | 83.5 | 16 | 15.3 | — |
| A | 83.4 | 83.9 | 14.4 | 14.8 | 90 |
| B | 86.2 | 85.3 | 11.5 | 13.3 | 180 |
| C | 86.5 | 86.6 | 10.8 | 11.9 | 265 |

The results of light transmission and light reflection in angle confirm the results obtained with normal incidence, namely a gain of TL of +4% and a RL reduction of the order of –4% for the best configuration B at 905 nm, a gain of TL of +3% and a reduction of RL of –3% for the best configuration C at 1550 nm.

Figure 2D:
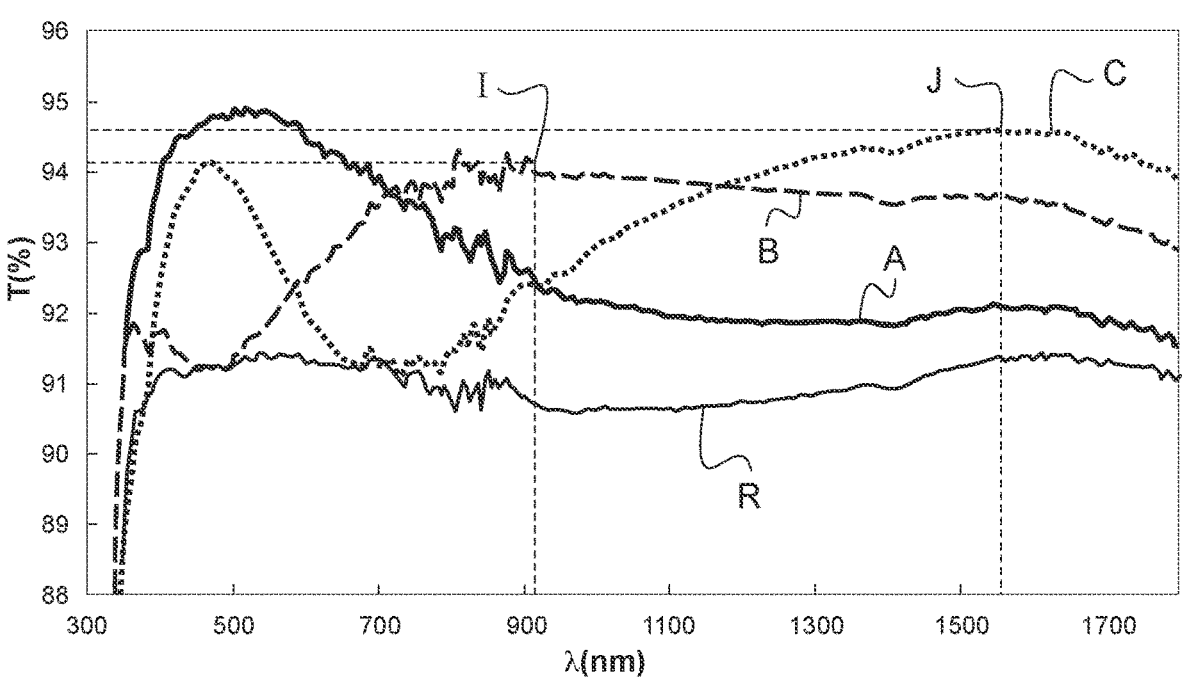
FIG. 2d shows transmission curves particularly infrared of a windshield in a range of wavelengths between 300 and 1800 nm.

FIG. 2d shows transmission curves particularly infrared of these glazings R, A, B C in a wavelength range between 300 and 800 nm and the transmission is located at LB1 905 nm (point I) and LB2 1550 nm (point J).

Monolithic glazings similar to glazings B C may be used for example for a side window or a window.

As shown in FIGS. 1 and 2a, the hole is here a closed hole (surrounded by the wall of the glass sheet), thus within the glazing particularly, with trapezoidal cross section, comprising:

a first large side or so-called upper longitudinal edge closest to the edge face of the upper longitudinal edge of the glazing 10, parallel to this edge face with a length of at most 20 cm for example 10.6 cm and spaced apart by at least 5 cm or 6 cm from the edge face (of the large side)

a second large side or said lower longitudinal edge (farthest from the edge face of the upper longitudinal edge 10, near the central zone) parallel to the first large side with a length of at most 25 cm or 20 cm and preferably greater than that of the first large side for example 17.5 cm, with a height (between the large sides) of at least 5 cm herein 10 cm.

The infrared vision system 7 is opposite the through-hole 4.

The through-hole 4 also can be a notch, therefore a through-hole preferably opening onto the roof side.

The through-hole 4 may be in another region of the windshield 100a or even in another glazing of the vehicle in particular the rear window.

The through-hole 4 may be central then a median line would divide it into two identical parts.

The anti-reflective coating 101 also is local (see FIG. 2a). Here it is rectangular in shape in this peripheral region and its edges protrude at most by 10 mm from the walls delimiting the hole 4 between face 12 and face Fa. Alternatively it is of homothetic shape at hole 4 or of any other shape.

The windshield 100a comprises on face F2 12 an opaque masking layer for example black 5, such as an enamel layer or a lacquer, forming a peripheral frame of the windshield (or of the window) and in the peripheral zone with the through-hole it comprises a gap 51' sufficiently large not to interfere with the performance of the LIDAR 7 but able to mask the casing 8 (plastic, metal etc) of the LIDAR 7. The casing 8 can be adhered to face F4 by an adhesive 6 and to the roof 80. The casing may be attached to a plate 8' mounted on face F4, with holes to allow said IR rays to pass.

The opaque layer is over thick (lower internal edge 51) in the central zone (along the longitudinal edge 10 rather than the lateral one 10'), where the transmission zone IR is formed.

Here, the camouflaging coating 101 is on face F2 and partially covers the masking layer.

The windshield 100a may comprise a set of metal wires that are almost invisible, for example 50 μm thick, which are placed on a face Fb on the F3 face of the lamination interlayer 3 (over all its area), in the form of lines that are optionally straight. These wires are absent from the through-hole 4.

As shown in FIGS. 2b and 2c, the through-hole 4 can alternatively be a notch, for example of trapezoidal shape (FIG. 2b) or rectangular shape (FIG. 2c), thus a through-hole which preferably opens on the roof side (on the upper longitudinal edge 10).

The through-hole can have rounded corners (FIGS. 2b and 2c). The outlines of the through-hole are 401,402,403, 404. The outlines of the gap of the masking layer are 502,503,504. For example the coating 101 on face F2 is spaced apart from the masking layer 5 (which does not overextend lightly in the hole here) and even within the through-hole 4 (does not overextend under face F3).

The closed or opening through-hole 4 may be in another region of the windshield 100a or even in another glazing of the vehicle, in particular the rear window.

Figure 3:
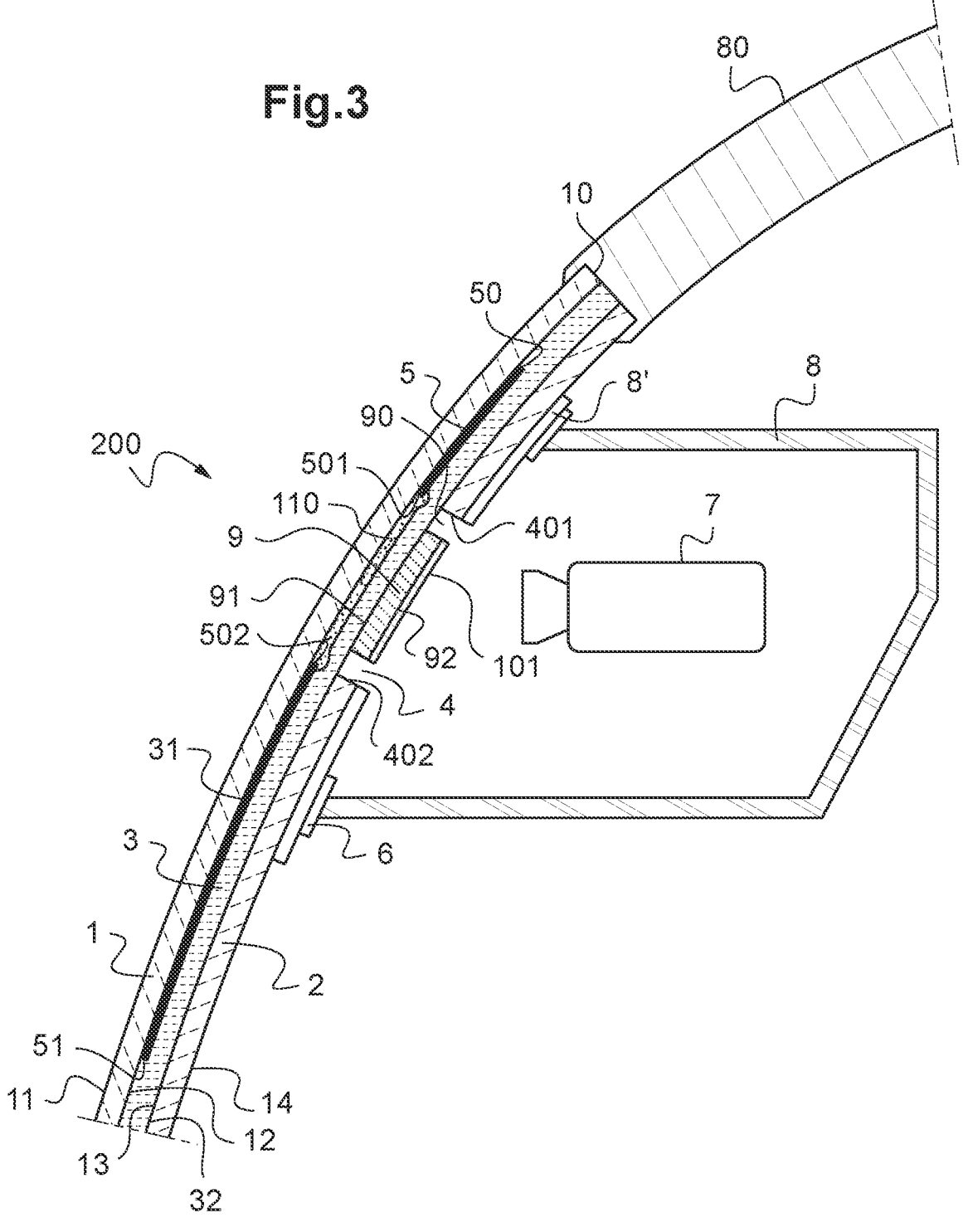
FIG. 3 shows schematically in cross sectional view a windshield 200 according to the invention with an infrared vision system such as a LIDAR in a second embodiment of the invention.
Figure 4:
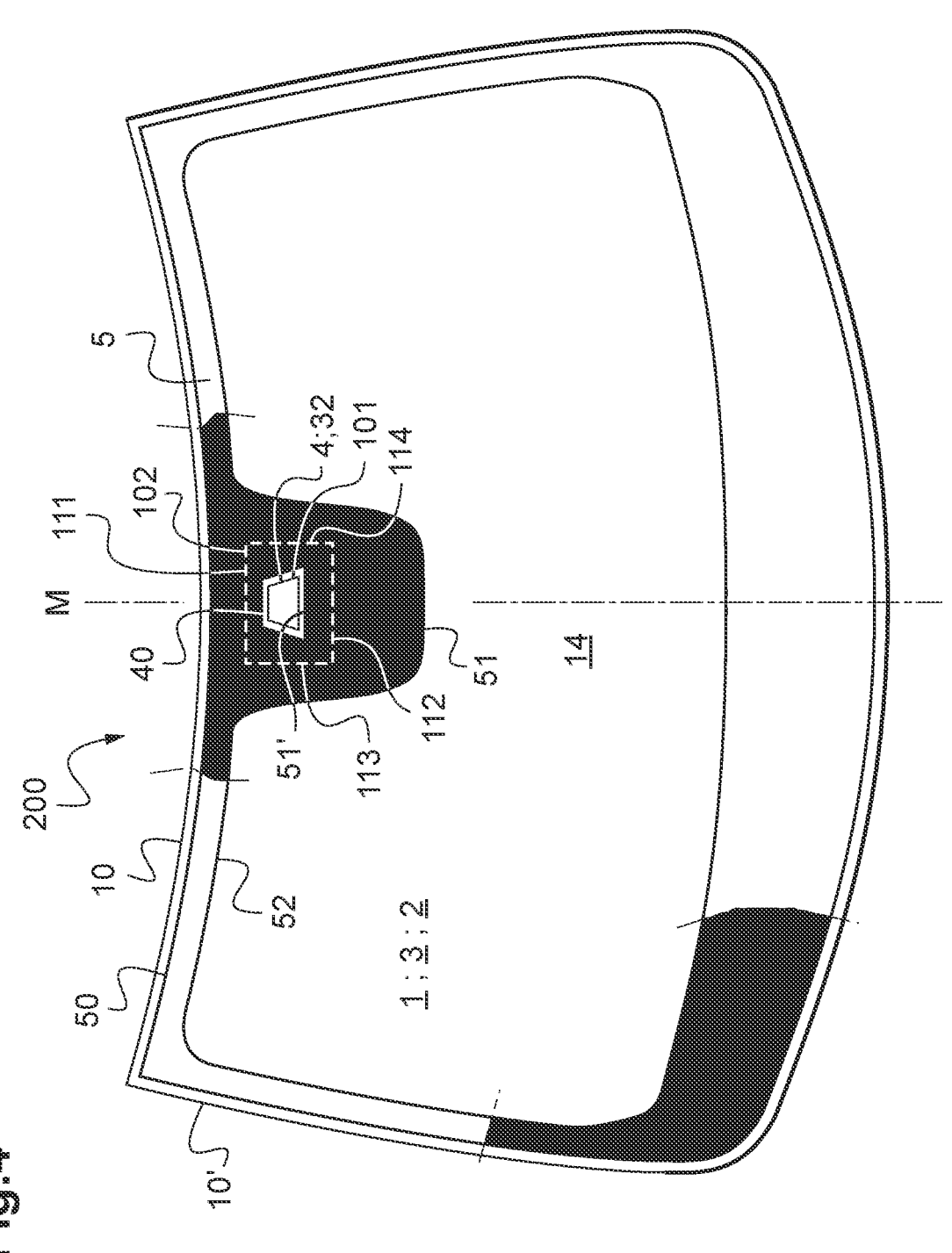
FIG. 4 shows a schematic front view (passenger compartment side) of the windshield 200 of FIG. 3.

FIG. 3 shows schematically in cross sectional view a windshield 200 with an infrared vision system such as a LIDAR in a second embodiment of the invention. FIG. 4 shows a schematic front view (passenger compartment side) of the windshield 200 of FIG. 3. Only the differences with the first embodiment are explained hereunder.

In the through-hole and optionally under the through-hole 4 (under face F3) there is a piece 9, particularly made of polymer or preferably of glass, transparent at least at the first so called working wavelength LB1 905±30 nm and/or at the second so called working wavelength LB2 1550±30 nm. The piece is for example an extra clear glass, soda-lime-silica-based, curved (domed) and optionally heat tempered or annealed, semi-tempered or without heat treatment or annealing.

The piece 9 has a so called connecting main surface 91, in particular bare or coated with a functional layer, here (and preferably) connected to the main face Fb (here in adhesive contact) and a so called interior main surface 92 opposite the connecting surface.

The interior surface 92 comprises said anti-reflective coating 101 at said working wavelength LB1 or LB2.

The piece 9 has an edge face in contact with or spaced apart from the wall 401, 402 delimiting the through-hole of the second glass sheet by at most 5 mm, preferably spaced apart and by a distance of at most 2 mm and even ranging from 0.3 to 2 mm.

The first glass sheet 1 comprises, on face F2, a camouflaging coating 110 which is transparent at the working wavelength in the infrared region LB1 or LB2 and absorbent in the visible region. The camouflaging coating 110 is rectangular in shape (longitudinal edges 111, 112 and lateral edges 113, 114) in this peripheral region (dashed line in FIG. 4 as not visible)

The edges 111 to 114 of the camouflaging coating optionally protrude between face F2 12 and face Fa 31 of the interlayer for example at most by 10 mm or 5 mm from the walls 401 to 404 delimiting the through-hole 4 of the second glass sheet. Here, the camouflaging coating 110 is on face F2 and partially covers the optional masking layer 5 on face F2.

The camouflaging coating 110 alternatively has another shape, for example a shape homothetic to that of the cross-section of the through-hole, thus for example a trapezoidal shape.

Possible variants are as follows (without being exhaustive), optionally cumulative:

the camouflaging coating 110 does not protrude from the through-hole of the second glass sheet (under face F3) and even is spaced apart from the edge of the through-hole, preferably by at most 1 cm or 5 mm the camouflaging coating 110 is spaced apart from the masking layer (for example which is in face F2 particularly of the enamel) or at least does not cover it.

The casing 8 is attached by an adhesive 6 to a plate 8' mounted on face F4, with holes to allow said IR rays to pass.

A laminated glazing is made comprising:

the first glass sheet which is a glass called Optiwhite of 1.95 mm for, a clear lamination interlayer PVB of 0.76 mm a second glass sheet with holes and comprising the glass piece with the anti-reflective coating of porous silica according to the invention, about 180 nm thick.

In example D; the piece is an extra clear glass called Optiwhite 1.95 mm thick. The glass is annealed during the formation of the porous silica layer. The glass is curved like the first glass sheet.

In an example E, the piece is a Gorilla glass 0.5 mm thick. This glass is flexible and is curved during assembly and the rest after laminating. The aluminosilicate glass is here annealed at more than 400° C. during the formation of the porous silica layer.

Transmission in the infrared region was measured at 905 nm an angle of incidence of 0°, and with an angle of incidence of 60° and the reflection in the infrared region at the angle of incidence of 8° and at the angle of incidence of 60°. The results are shown in Tables 3 and 4 for glazings D and E optimized for 905 nm.

TABLE 3

| Example | TL at 905 nm at 0° (%) | RL at 905 nm at 8° (%) |
|---|---|---|
| D | 92.4 | 4.5 |
| E | 92.5 | 4.9 |

TABLE 4

| Example | TL at 905 nm at 60° (%) | RL at 905 nm at 60° (%) |
|---|---|---|
| D | 85.2 | 10.5 |
| E | 86.2 | 10.4 |

Figure 5:
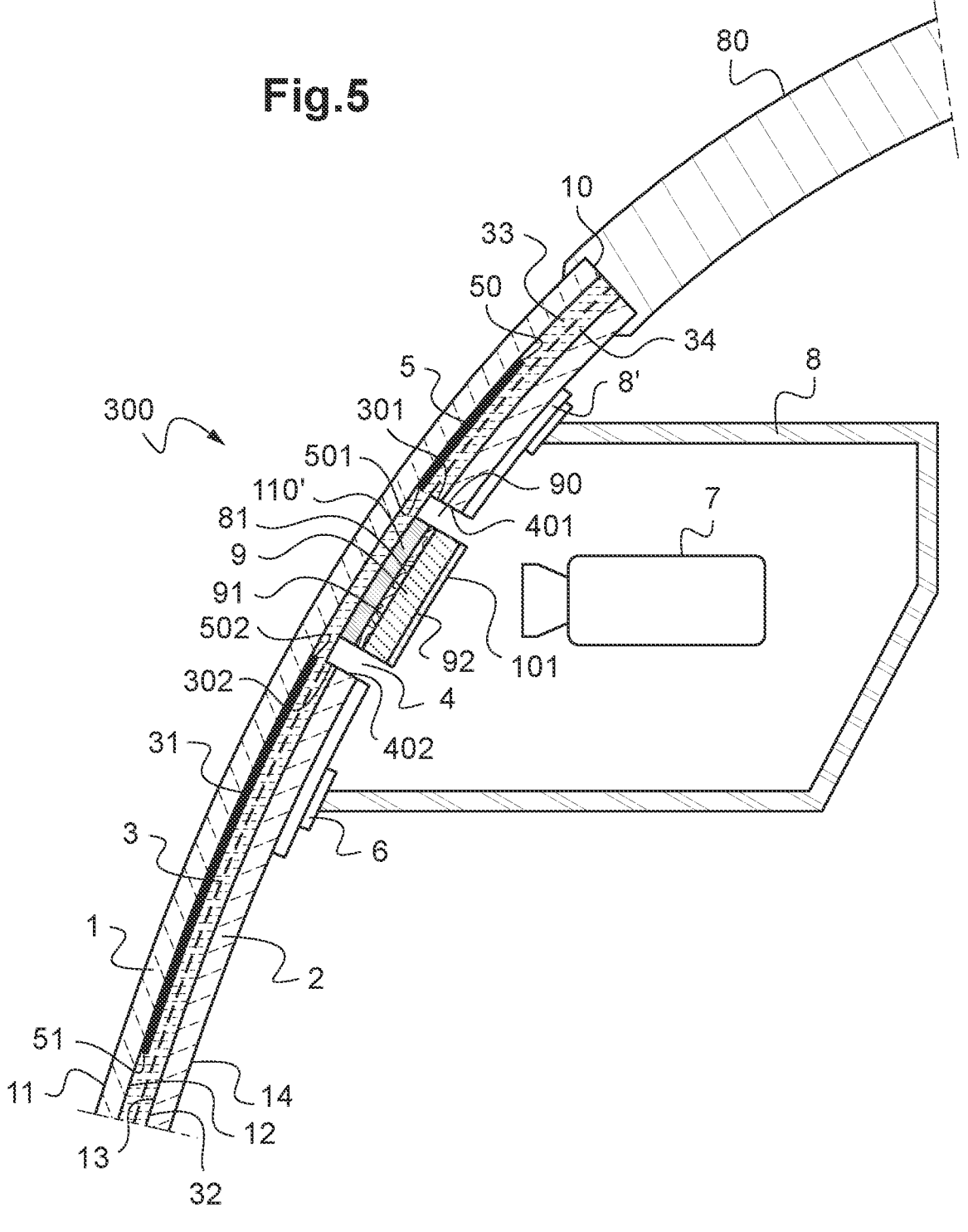
FIG. 5 shows a schematic sectional view of a windshield 300 according to the invention with an infrared vision system such as a LIDAR in a third embodiment of the invention.

FIG. 5 shows a schematic sectional view of a windshield 300 according to the invention with an infrared vision system such as a LIDAR in a third embodiment of the invention.

Only the differences with the second embodiment are explained below.

The lamination interlayer 3, for example made of two PVB sheets 33, 34, has a partial interlayer hole in line with the through-hole 4 (for example full hole on the sheet 34, on face F3 side).

The interlayer hole may preferably be identical in size to, or wider than, the through-hole 4 and even optionally is a closed partial interlayer hole in the thickness of the lamination interlayer 3 delimited by an interlayer wall 301, 302.

The interlayer hole here has the same trapezoidal shape as the through-hole 4 with two large sides 301, 302 and two small sides. The interlayer hole may preferably be identical in size or wider than the through-hole 4 for example the walls 301, 302 delimiting the interlayer hole being set back by at most 10 mm or 5 mm from the walls of the glass 401, 402 delimiting the through-hole. As a variant, this is a rectangle or any other shape encompassing the surface of the through-hole (trapezoidal or other).

Moreover (instead of the camouflaging coating in face F2) optionally a polymer film (colored) forming camouflaging selective filter 110' is adhered for example by a pressure-sensitive adhesive 81 to the connecting surface 91 of the piece 9.

Figure 6:
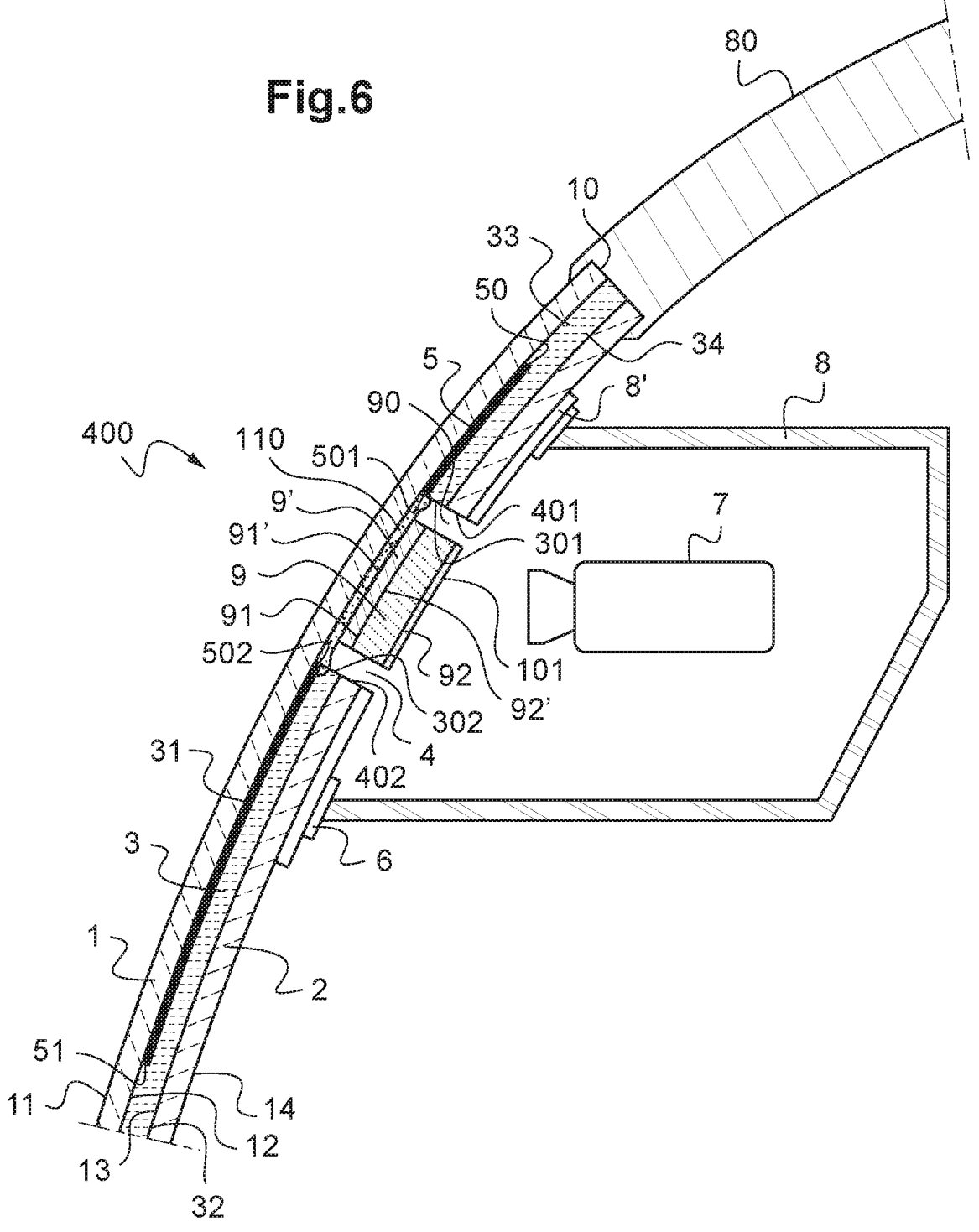
FIG. 6 shows schematically in cross sectional view a windshield 400 according to the invention with an infrared vision system such as a LIDAR in a fourth embodiment of the invention.

FIG. 6 shows schematically in cross sectional view a windshield 400 according to the invention, with an infrared vision system such as a LIDAR in a fourth embodiment of the invention.

Only the differences with the third embodiment are explained below.

The lamination interlayer, optionally made of two PVB sheets 33, 34, has an interlayer through-hole in line with the closed through-hole delimited by walls 301, 302.

The interlayer through-hole can preferably be of identical size or wider than the hole 4.

The interlayer through-hole here has the same trapezoidal shape as the hole 4 with two large sides 301, 302 and two small sides.

The interlayer hole may preferably be identical in size to, or wider than, the hole 4 for example the walls 301, 302 delimiting the interlayer hole being set back by at most 10 mm or 5 mm from the walls of the glass 401, 402. As a variant, this is a rectangle or any other shape encompassing the surface of the through-hole (trapezoidal or other).

As a variant, not shown in the examples, the connecting film is replaced with an adhesive.

There is a camouflaging coating 110 in face F2 as already described in FIG. 3.

Figure 7:
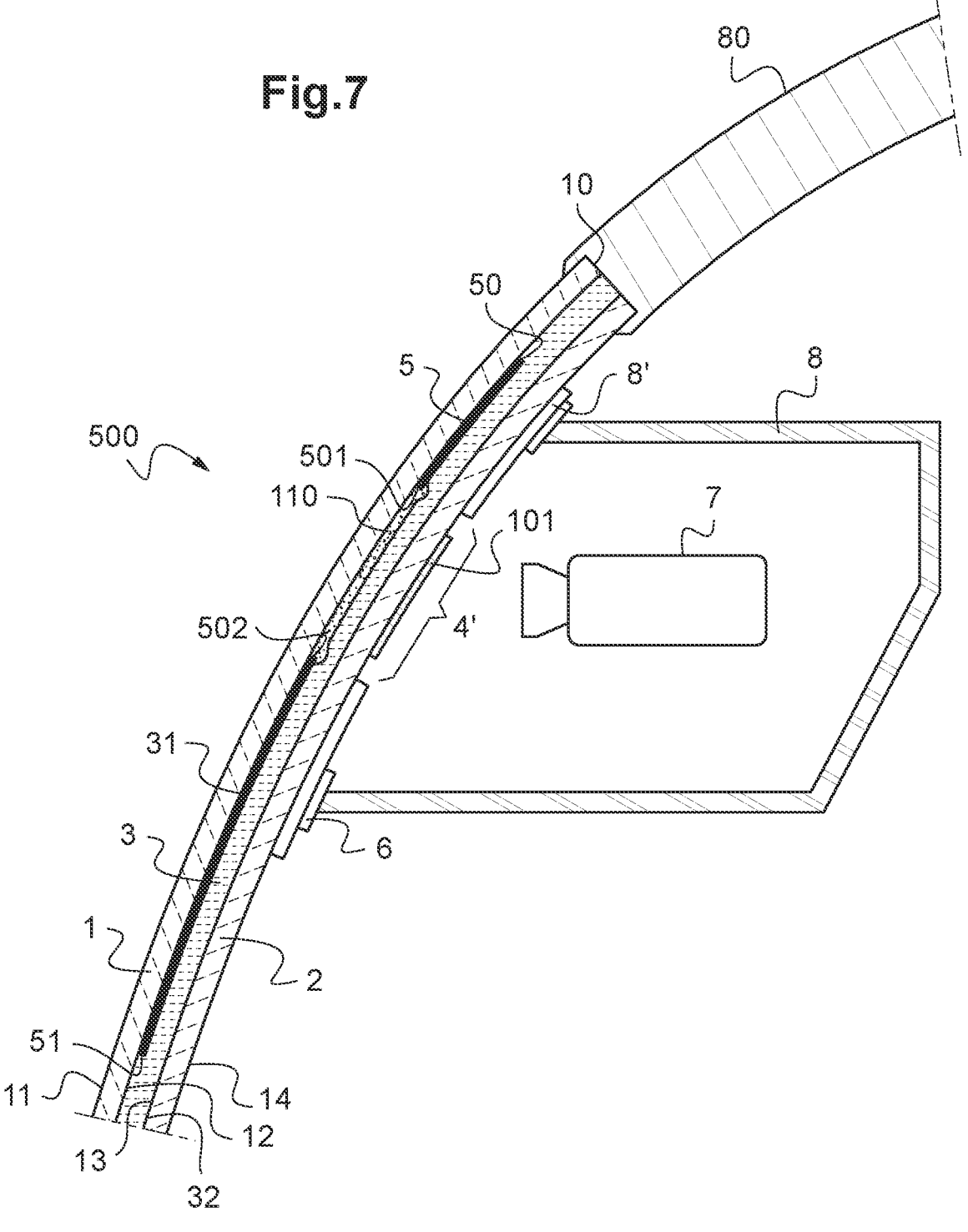
FIG. 7 shows a schematic sectional view a of windshield 500 according to the invention, with an infrared vision system such as a LIDAR in a fifth embodiment of the invention.

FIG. 7 shows a schematic cross sectional view of a windshield 500 according to the invention, with an infrared vision system such as a LIDAR in a fifth embodiment of the invention.

Only the differences with the first embodiment are explained hereunder.

The second glass sheet 2 does not have holes. It is made of extra clear glass.

There is a camouflaging coating 110 in face F2 as already described in FIG. 3. Alternatively, a colored polymer film embedded in the PVB is chosen.

The anti-reflective coating 101 is on face F4 14 opposite the gap of the masking layer 5 (high edge 501 and low edge 502) defining the infrared transmission zone 4'.

The casing 8 is attached by an adhesive 6 to a plate 8' mounted on face F4, with holes to allow said IR rays to pass into zone 4'.

For this laminated glazing comprising two glasses called Optiwhite 1.95 mm thick and a PVB of 0.76 mm and with anti-reflective coating according to the invention which here is a porous silica on face F4 the transmission in the infrared region was measured at 905 nm and 1550 nm, an angle of incidence of 0°, and with an angle of incidence of 60° and the reflection in the infrared region at the angle of incidence of 8° and at the angle of incidence of 60°.

The results are shown in Tables 5 and 6 for glazing A optimized in the visible region and glazing B optimized for 905 nm (underlined values).

TABLE 5

| Example | TL at 905 nm at 0° (%) | TL at 1550 nm at 0° (%) | RL at 905 nm at 8° (%) | RL at 1550 nm at 8° (%) | thickness (nm) |
|---|---|---|---|---|---|
| A | 90.7 | 85.9 | 5.8 | 6.4 | 90 |
| B | 92.1 | 87.3 | 4.0 | 4.7 | 180 |

TABLE 6

| Example | TL at 905 nm at 60° (%) | TL at 1550 nm at 60° (%) | RL at 905 nm at 60° (%) | RL at 1550 nm at 60° (%) | thickness (nm) |
|---|---|---|---|---|---|
| A | 81.1 | 76.3 | 14 | 13.5 | 90 |
| B | 83.9 | 77.7 | 10.7 | 12 | 180 |

With reference to the presented embodiments, possible variants are as follows (without being exhaustive) optionally cumulative:

the anti-reflective coating comprises a chemical protection underlayer, particularly a dense silica layer, particularly by sol-gel, with the functional layer of sol-gel porous silica positioned on top face F2 comprises (as a functional coating) an athermic functional layer particularly heating (silver or TCO), optionally partially under or on the enamel in face F2 for example, which a gap in line with the infrared transmission window (in line with the through-hole of the second sheet if need be)

face F3 comprises an athermic functional layer particularly heating (silver or TCO) with a gap in line with the infrared transmission window the laminated glazing comprises a submillimetric polymer film (PET for example) (even of no more than 300 μm or 200 μm or 150 μm or 100 μm) on the PVB and under face F3 or between two sheets of the interlayer (PVB) and coated with an athermic functional layer particularly heating with a gap in line of the infrared transmission window (in line with the through-hole of the second sheet if need be)

the glazing comprises an electrically conductive layer which is transparent, heating, transparent at said first working wavelength LB1 and/or at said second working wavelength LB2, particularly made of transparent conductor oxide, and which is located in the infrared transmission zone (for example on face F2 in replacement of layer 110 or even on piece 9 in the through-hole on the side opposite the anti-reflective coating or on a polymer film such as the submillimetric PET (even of no more than 150 μm or 100 μm particularly under the through-hole of the second glass sheet if need be).

The invention claimed is:

1. A vehicle glazing, comprising:

a first glass sheet forming an exterior glazing, with a first external main face oriented towards an exterior environment of a vehicle and a second internal main face oriented toward a passenger compartment of the vehicle, a lamination interlayer made of polymer material with a first main face oriented toward the second internal main face and with a second main face opposite the first main face, a second glass sheet intended to be the interior glazing with a third external main face on a side of the second internal main face and a fourth internal main face oriented toward the passenger compartment, at least one first zone that forms an infrared transmission zone transparent at at least a first working wavelength in the infrared region which is 905 nm±30 nm and/or at least a second working wavelength in the infrared region which is 1550 nm±30 nm, or both at said first working wavelength and said second working wavelength, an opaque masking layer on the second internal main face or on the first main face of the lamination interlayer and the opaque masking layer is absent at least in a central zone in line with the infrared transmission zone or has a gap in line with the infrared transmission zone, wherein in said infrared transmission zone, the glazing comprises opposite the first external main face:

a) an anti-reflective coating at the first working wavelength with a thickness which is 165 nm±50 nm and in the infrared transmission zone the glazing with the anti-reflective coating has a total transmission of at least 85% at the first working wavelength, b) or an anti-reflective coating at the second working wavelength with a thickness which is 275 nm±50 nm and in the infrared transmission zone the glazing with said anti-reflective coating has a total transmission of at least 85% at the second working wavelength.

2. The vehicle glazing according to claim 1, wherein for a), said anti-reflective coating has a total transmission of at least 90% at the first working wavelength at the angle of incidence of 0° and a total transmission of at least 80% at the angle of incidence of 60°, or for b), said anti-reflective coating has a total transmission of at least 90% at the second working wavelength at the angle of incidence of 0° and a total transmission of at least 80% at the angle of incidence of 60° at LB2.

3. The vehicle glazing according to claim 1, wherein for a), said anti-reflective coating has a reflection of at most 7% at the first working wavelength at the angle of incidence of 8° or for b), said anti-reflective coating has a reflection of at most 7% at the second working wavelength at the angle of incidence of 8°.

4. The vehicle glazing according to claim 1, wherein the anti-reflective coating comprises a layer of porous silica.

5. The vehicle glazing according to claim 1, wherein the anti-reflective coating comprises a chemical protection underlayer with a functional layer of porous silica positioned on top.

6. The vehicle glazing according to claim 1, wherein the anti-reflective coating is on a substrate and the substrate is selected from among:

i) the second glass sheet, the anti-reflective coating on the fourth internal main face bare or coated with a functional coating, or j) a piece, the anti-reflective coating on a free face of the transparent piece at said first working wavelength or at said second working wavelength, or both at first working wavelength and at said second working wavelength, said piece being under or in a through-hole of the second glass sheet, or both, or k) the first glass sheet, the anti-reflective coating on the second internal main face, bare or coated with a functional coating, the lamination interlayer being perforated by an interlayer through-hole in line with a through-hole of the second glass sheet.

7. The vehicle glazing according to claim 6, wherein in configuration j), the piece is on the lamination interlayer or adhered to the second internal main face with the lamination interlayer perforated by an interlayer through-hole in line with said through-hole.

8. The vehicle glazing according to claim 6, wherein in configuration j), the piece is made of glass that is extra clear.

9. The vehicle glazing according to claim 6 wherein in configuration j), the piece is made of glass with a thickness of at most 2.2 mm and of at least 0.1 mm.

10. The vehicle glazing according to claim 1, wherein the infrared transmission zone is in a peripheral region of the glazing.

11. The vehicle glazing according to claim 1, wherein the infrared transmission zone is centimetric.

12. The vehicle glazing according to claim 1, further comprising another infrared transmission zone disjoined from the infrared transmission zone, the anti-reflective coating a) or b) is an anti-reflective coating common to these two infrared transmission zones.

13. The vehicle glazing according to claim 1, further comprising a transparent heating electrically conductive layer, transparent at said first working wavelength or at said second working wavelength, or both at said first working wavelength and at said second working wavelength, and which is located from the infrared transmission zone.

14. A device, comprising:

said vehicle glazing according to claim 1, an infrared vision system at said first working wavelength or at said second working wavelength, or both at said first working wavelength and at said second working wavelength, disposed in the passenger compartment behind said vehicle glazing so as to send or receive, or both send and receive, radiation after passing through the vehicle glazing at the infrared transmission zone.

15. The vehicle glazing according to claim 1, wherein the vehicle glazing is a glazing of a road or railway vehicle.

16. The vehicle glazing according to claim 1, wherein the anti-reflective coating comprises a chemical protection underlayer, which is a dense silica layer, with a functional layer of porous silica positioned on top.

17. A vehicle glazing, comprising:

a first glass sheet forming an exterior glazing, with a first external main face oriented towards an exterior environment of a vehicle and a second internal main face oriented toward a passenger compartment of the vehicle, a lamination interlayer made of polymer material with a first main face oriented toward the second internal main face and with a second main face opposite the first main face, a second glass sheet forming an interior glazing with a third external main face on a side of the second internal main face and a fourth internal main face oriented toward the passenger compartment, at least one first zone that forms an infrared transmission zone transparent at at least a first working wavelength in the infrared region which is 905 nm±30 nm or at least a second working wavelength in the infrared region which is 1550 nm±30 nm, or both at said first working wavelength and said second working wavelength, an opaque masking layer in on the fourth internal main face of the second glass sheet and the opaque masking layer is absent at least in a central zone in line with the infrared transmission zone or has a gap in line with the infrared transmission zone, wherein in said infrared transmission zone, the glazing comprises opposite the first external main face:

a) an anti-reflective coating at the first working wavelength with a thickness which is 165 nm±50 nm and in the infrared transmission zone the glazing with the anti-reflective coating has a total transmission of at least 85% at the first working wavelength, b) or an anti-reflective coating at the second working wavelength with a thickness which is 275 nm±50 nm and in the infrared transmission zone the glazing with said anti-reflective coating has a total transmission of at least 85% at the second working wavelength.

18. A vehicle glazing, comprising:

a first glass sheet forming an exterior glazing, with a first external main face oriented towards an exterior environment of a vehicle and a second internal main face oriented toward a passenger compartment of the vehicle, at least one first zone that forms an infrared transmission zone transparent at at least a first working wavelength in the infrared region which is 905 nm±30 nm or at least a second working wavelength in the infrared region which is 1550 nm±30 nm, or both at said first working wavelength and said second working wavelength, wherein in said infrared transmission zone, the glazing comprises opposite the first external main face:

a) an anti-reflective coating at the first working wavelength with a thickness which is 165 nm±50 nm and in the infrared transmission zone the glazing with the anti-reflective coating has a total transmission of at least 85% at the first working wavelength, b) or an anti-reflective coating at the second working wavelength with a thickness which is 275 nm±50 nm and in the infrared transmission zone the glazing with said anti-reflective coating has a total transmission of at least 85% at the second working wavelength, and wherein in the infrared transmission zone with the anti-reflective coating, the vehicle glazing comprises on the second internal main face side a selective filter absorbent in the visible region and transparent at said first working wavelength or at said second working wavelength, or both at said first working wavelength and at said second working wavelength, the vehicle glazing having a total transmission of no more than 10.0% in the visible region.

19. The vehicle glazing according to claim 18, wherein the selective filter is a camouflaging coating and the anti-reflective coating is distant from the second internal main face.

20. A vehicle glazing, comprising:
a first glass sheet forming an exterior glazing, with a first external main face oriented towards an exterior environment of a vehicle and a second internal main face oriented toward a passenger compartment of the vehicle,
a lamination interlayer made of polymer material with a first main face oriented toward the second internal main face and with a second main face opposite the first main face,
a second glass sheet forming an interior glazing with a third external main face on a side of the second internal main face and a fourth internal main face oriented toward the passenger compartment,
at least one first zone that forms an infrared transmission zone transparent at at least a first working wavelength in the infrared region which is 905 nm±30 nm or at least a second working wavelength in the infrared region which is 1550 nm±30 nm, or both at said first working wavelength and said second working wavelength,
on the second internal main face of the first glass sheet or the third external main face of the second glass sheet, a functional layer extending over all or part of the glazing, which is an electrically conductive layer that is transparent or an opaque masking layer, which functional layer is absorbent at said first working wavelength or at said second working wavelength, or both at said first working wavelength and at said second working wavelength, and which is absent from the infrared transmission zone at least in a central zone in line with the infrared transmission zone,
wherein in said infrared transmission zone, the glazing comprises opposite the first external main face:
a) an anti-reflective coating at the first working wavelength with a thickness which is 165 nm±50 nm and in the infrared transmission zone the glazing with the anti-reflective coating has a total transmission of at least 85% at the first working wavelength,
b) or an anti-reflective coating at the second working wavelength with a thickness which is 275 nm±50 nm and in the infrared transmission zone the glazing with said anti-reflective coating has a total transmission of at least 85% at the second working wavelength.

\* \* \* \* \*